(12) United States Patent
Wardenaar

(10) Patent No.: US 9,152,235 B2
(45) Date of Patent: Oct. 6, 2015

(54) VIDEO PEEKING

(75) Inventor: Matthew Jacob Wardenaar, Sherman Oaks, CA (US)

(73) Assignee: Thomas Licensing, Issy Les Moulineaux (FR)

( * ) Notice: Subject to any disclaimer, the term of this patent is extended or adjusted under 35 U.S.C. 154(b) by 9 days.

(21) Appl. No.: 14/236,105

(22) PCT Filed: Feb. 21, 2012

(86) PCT No.: PCT/US2012/025878
§ 371 (c)(1),
(2), (4) Date: Jan. 30, 2014

(87) PCT Pub. No.: WO2013/022486
PCT Pub. Date: Feb. 14, 2013

(65) Prior Publication Data
US 2014/0176479 A1    Jun. 26, 2014

Related U.S. Application Data

(60) Provisional application No. 61/515,578, filed on Aug. 5, 2011.

(51) Int. Cl.
*G06F 3/01* (2006.01)
*G11B 27/34* (2006.01)
(Continued)

(52) U.S. Cl.
CPC .............. *G06F 3/017* (2013.01); *G06F 3/0346* (2013.01); *G06F 3/041* (2013.01); *G06F 3/0482* (2013.01);
(Continued)

(58) Field of Classification Search
CPC ....... G06F 3/017; G06F 3/0346; G06F 3/041; G06F 3/0482; G06F 3/0488; G06F 3/04883; G06F 3/0484; G06F 3/04842; G06F 3/04845; G06F 3/0485; G06F 3/0416; G06F 3/04855; H04N 1/00458; H04N 21/4312; H04N 21/4383; G11B 27/34
USPC ................................................. 345/173, 661
See application file for complete search history.

(56) References Cited

U.S. PATENT DOCUMENTS 7,532,253 B1    5/2009  Greenberg
7,864,163 B2    1/2011  Ording et al.
(Continued)

FOREIGN PATENT DOCUMENTS

EP    1450277    8/2004
EP    150825     2/2005
(Continued)

OTHER PUBLICATIONS

Shirazi, "Java Performance Tuning, Chapter 4, Object Creation," O'Reilly Online Catalog, Sep. 2000, 442 pages.
(Continued)

*Primary Examiner* — Tom Sheng
(74) *Attorney, Agent, or Firm* — Robert D. Shedd; Harvey D. Fried

(57) ABSTRACT

A new user interface and display system for a video display device with a touch screen makes it possible to peek at, that is view briefly, a selected video content while watching other content. During a video peek, video from a second video source will be seen to partially displace and temporarily replace a portion of a video presently being viewed. Selection of the other video sources can be controlled, for example, by swiping with one, two, three or four finger tips and by swiping inwardly from any one of the four edges of a video display. Moreover, the video presently being viewed can be interchanged with the video being peeked at.

14 Claims, 15 Drawing Sheets

(51) Int. Cl.
  *H04N 21/431* (2011.01)
  *H04N 21/438* (2011.01)
  *G06F 3/0488* (2013.01)
  *G06F 3/0482* (2013.01)
  *G06F 3/0346* (2013.01)
  *G06F 3/041* (2006.01)

(52) U.S. Cl.
  CPC ............ *G06F 3/04883* (2013.01); *G11B 27/34* (2013.01); *H04N 21/4312* (2013.01); *H04N 21/4383* (2013.01)

(56) References Cited

U.S. PATENT DOCUMENTS

| | | | |
|---|---|---|---|
| 8,477,122 B2* | 7/2013 | Takagi | 345/204 |
| 2003/0126605 A1 | 7/2003 | Betz et al. | |
| 2007/0013708 A1 | 1/2007 | Barcklay et al. | |
| 2008/0062141 A1 | 3/2008 | Chandhri | |
| 2008/0079972 A1 | 4/2008 | Goodwin et al. | |
| 2009/0153478 A1 | 6/2009 | Kerr et al. | |
| 2009/0199241 A1 | 8/2009 | Unger et al. | |
| 2009/0210819 A1 | 8/2009 | Fujimoto et al. | |
| 2009/0328101 A1 | 12/2009 | Suomela et al. | |
| 2010/0077433 A1 | 3/2010 | Beyabani | |
| 2010/0079672 A1* | 4/2010 | Bae et al. | 348/565 |
| 2011/0081953 A1 | 4/2011 | Higuchi | |
| 2011/0249027 A1* | 10/2011 | Tsuda et al. | 345/634 |
| 2012/0069055 A1* | 3/2012 | Otsuki et al. | 345/681 |
| 2012/0110509 A1* | 5/2012 | Isozu et al. | 715/830 |
| 2012/0236037 A1* | 9/2012 | Lessing et al. | 345/661 |
| 2012/0262462 A1* | 10/2012 | Montan et al. | 345/473 |
| 2013/0123023 A1* | 5/2013 | Morita et al. | 463/43 |
| 2013/0135200 A1* | 5/2013 | Iwashita | 345/156 |
| 2013/0141371 A1* | 6/2013 | Hallford et al. | 345/173 |
| 2013/0159941 A1* | 6/2013 | Langlois et al. | 715/863 |
| 2013/0201131 A1* | 8/2013 | Choi | 345/173 |
| 2013/0212525 A1* | 8/2013 | Shogaki | 715/799 |
| 2013/0222305 A1* | 8/2013 | Kanno | 345/173 |
| 2014/0089845 A1* | 3/2014 | Liang et al. | 715/798 |
| 2014/0184537 A1* | 7/2014 | Hsu et al. | 345/173 |
| 2014/0192245 A1* | 7/2014 | Lee et al. | 348/333.05 |
| 2014/0240348 A1* | 8/2014 | Arita et al. | 345/629 |
| 2015/0067614 A1* | 3/2015 | Jong et al. | 715/863 |

FOREIGN PATENT DOCUMENTS

| | | |
|---|---|---|
| EP | 2144385 | 1/2010 |
| EP | 2169949 | 3/2010 |
| EP | 2182431 | 5/2010 |

OTHER PUBLICATIONS

Kosara, Indirect Multi-Touch Interaction for Brushing in Parallel Coordinates, Visualization and Data Analysis (VDA), pp. 786809-1 to 786809-7, Dec. 2011.

Anonymous, "iPod touch User Guide for iPhone OS 3.1 Software"; Apple Inc, retrieved from the Internet: URL: http://manuals.info.apple.com/MANUALS/1000/MA1135/en_US/iPod_Touch_3.1_User___Guide.pdf, Sep. 30, 2009, pp. 93-95.

* cited by examiner

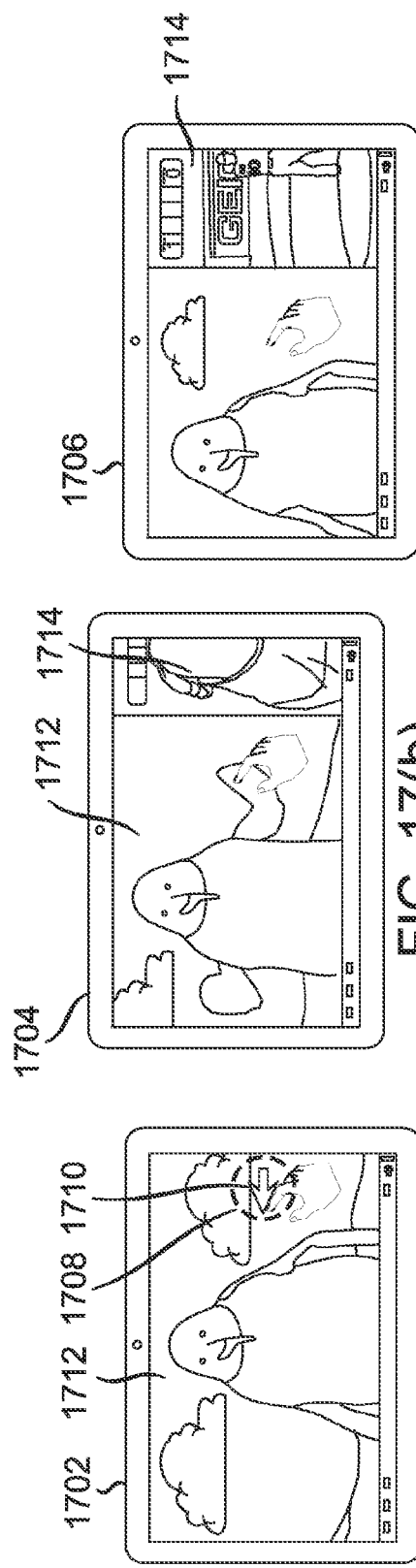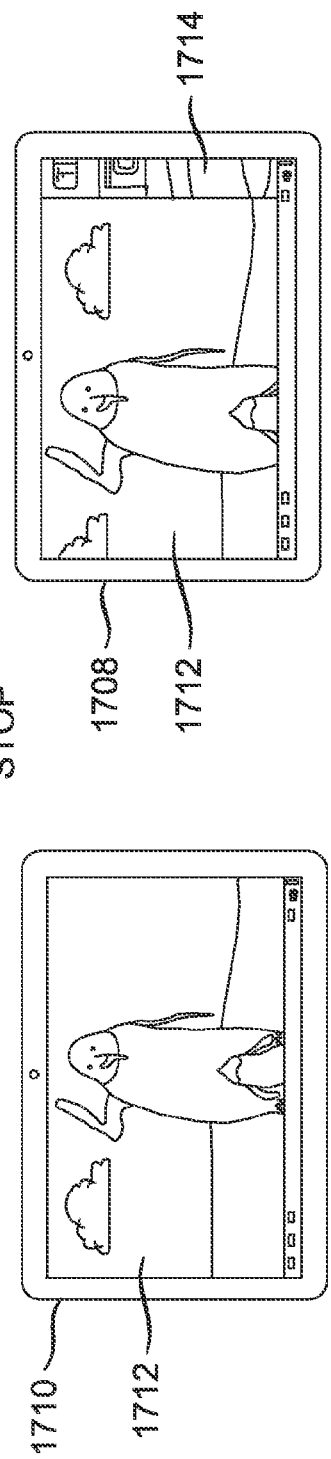

VIDEO PEEKING

CROSS REFERENCE TO RELATED APPLICATIONS

This application claims the benefit, under 35 U.S.C. §365 of International Application PCT/US12/025878, filed Feb. 21, 2012 which was published in accordance with PCT Article 21(2) on Feb. 14, 2013 in English and which claims the benefit of U.S. provisional patent application No. 61/515,578, filed Aug. 5, 2011.

BACKGROUND OF THE INVENTION

The background of the invention relates to the general operation of a touch activatable screen in a video tablet or other display device. The description of a touch activatable screen in a video tablet or other display device found herein can also be found in PCT/US2010/049772. Patents, published applications and articles cited in the initial International Search Report for PCT/US2010/049772, and thus relating to the general operation of a touch activatable screen include: US2009210819A1; US20070013708A1; US20080079972A1; US20090153478A1; US2009019924A1; EP1450277A2; and SHIRAZI J: "Java Performance Tuning—Chapter 4 Object Creation". It should be understood that the elements shown in the figures can be implemented in various forms of hardware, software or combinations thereof. Preferably, these elements are implemented in a combination of hardware and software on one or more appropriately programmed general-purpose devices, which can include a processor, memory and input/output interfaces. Herein, the phrase "coupled" is defined to mean directly connected to or indirectly connected with through one or more intermediate components. Such intermediate components can include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor (DSP) hardware, read only memory (ROM) for storing software, random access memory (RAM), and nonvolatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure provides for a grid display which is a graphical user interface view that enables a user to navigate a set of data elements in two dimensional space (i.e., x and y directions). The gird display can have a two dimensional (2D) pattern, e.g., columns and rows, but can take other forms. Navigation of the grid display can be accomplished using commends, such as gestures, to locate the desired element. An entry in the grid display is tapped or otherwise selected to initiate further action, e.g., executing or playing associated content. This interface mechanism is for use in media applications where items on the gird display can be represented graphically such as by audio album covers or video poster images. The particular embodiments describe an apparatus and method associated with optimizations to the view of a grid display implementation such that the number of display elements is minimized and independent of the number of items in the full dataset. The embodiments also address issues with navigation through the database so that it can be smooth and efficient with respect to the visual perception of the displayed portion. The apparatus and method can be particularly adapted for use in a content distribution network encompassing controlled access to a large database of media content.

Navigation through the user interface of the present disclosure is facilitated by a mechanism to move quickly, simply and accurately across a display, such as a television, monitor, or touch screen. In one embodiment, an input device such as a motion sensing remote controller is provided. In another embodiment, a touch screen or panel remote device is employed having the cursor on a screen essentially tracking the user's finger or fingers as they move across the remote controller's screen. As the user passes over the grid display, the graphic elements representing content in the database move in response to the user's input where certain graphic elements disappear and new graphic elements appear. In the touch screen or panel remote device embodiment, it is to be appreciated that the touch screen or panel remote device can serve as a display device itself or can simply serve as a navigational tool. In a further embodiment, a conventional hand-held remote controller is employed using at least one button or input mechanism disposed on a surface of the remote controller to navigate the grid display.

Initially, systems for delivering various types of content to a user will be described. Subsequently, a method and user interface for searching the content in accordance with embodiments of the present disclosure will then be detailed.

Turning now to FIG. 1, a block diagram of an embodiment of a system 100 for delivering content to a home or end user is shown. The content originates from a content source 102, such as a movie studio or production house. The content can be supplied in at least one of two forms. One form can be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager can collect and store the content, and can schedule delivery of the content over a deliver network, shown as delivery network 1 (106). Delivery network 1 (106) can include satellite link transmission from a national center to one or more regional or local centers. Delivery network 1 (106) can also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and can be embodied as a set top box/digital video recorder (DVR), a gateway, a modem, etc. Further, the receiving device 108 can act as entry point, or gateway, for a home network system that includes additional devices configured as either client or peer devices in the home network.

A second form of content is referred to as special content. Special content can include content delivered as premium viewing, pay-per-view, or other content otherwise not provided to the broadcast affiliate manager, e.g., movies, video games or other video elements. In many cases, the special content can be content requested by the user. The special content can be delivered to a content manager 110. The content manager 110 can be a service provider, such as an Internet website, affiliated, for instance, with a content provider, broadcast service, or delivery network service. The content manager 110 can also incorporate Internet content into the delivery system. The content manager 110 can deliver the content to the user's receiving device 108 over a separate delivery network, delivery network 2 (112). Delivery network 2 (112) can include high-speed broadband Internet type communications systems. It is important to note that the content from the broadcast affiliate manager 104 can also be delivered using all or parts of delivery network 2 (112) and content from the content manager 110 can be delivered using all or parts of delivery network 1 (106). In addition, the user can also obtain content directly from the Internet via delivery network 2 (112) without necessarily having the content managed by the content manager 110.

Several adaptations for utilizing the separately delivered content can be possible. In one possible approach, the special content is provided as an augmentation to the broadcast content, providing alternative displays, purchase and merchandising options, enhancement material, etc. In another embodiment, the special content can completely replace some programming content provided as broadcast content. Finally, the special content can be completely separate from the broadcast content, and can simply be a media alternative that the user can choose to utilize. For instance, the special content can be a library of movies that are not yet available as broadcast content.

The receiving device 108 can receive different types of content from one or both of delivery network 1 and delivery network 2. The receiving device 108 processes the content, and provides a separation of the content based on user preferences and commands. The receiving device 108 can also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 can be a conventional 2-D type display or can alternatively be an advanced 3-D display.

A block diagram of an embodiment of a receiving device 200 is shown in FIG. 2. Receiving device can operate similar to the receiving device 108 described in FIG. 1 and can be included as part of a gateway device, modem, set top box, or other similar communications device. The device 200 shown can also be incorporated into other systems including the display device (114) itself. In either case, several components necessary for complete operation of the system are not shown in the interest of conciseness, as they are well known to those skilled in the art.

In the device 200, the content is received in an input signal receiver 202. The input signal receiver 202 can be one of several known receiver circuits used for receiving, demodulation, and decoding signals provided over one of the several possible networks including over the air, cable, satellite, Ethernet, fiber and phone line networks. The desired input signal can be selected and retrieved in the input signal receiver 202 based on user input provided through a control interface (not shown). The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 114 or an audio amplifier (not shown). Alternatively, the audio interface 208 can provide a digital signal to an audio output device or display device using a High-Definition Multimedia Interface (HDMI) cable or alternate audio interface such as via a Sony/Philips Digital Interconnect Format (SPDIF). The audio processor 206 also performs any necessary conversion for the storage of the audio signals.

The video output from the input stream processor 204 is provided to a video processor 210. The video signal can be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 can be a hard disk drive, one or more large capacity integrated electronic memories, such as static RAM (SRAM), or dynamic RAM (DRAM), or can be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 can be an analog signal interface such as red-green-blue (RGB) or can be a digital interface such as HDMI. It is to be appreciated that the display interface 218 will generate the various screens for presenting the search results in a three dimensional gird as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the gird display representing the content, either stored or to be delivered via the delivery networks, described above. The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Further, the implementation of the memory can include several possible embodiments, such as a single memory device or, alternatively, more than one memory circuit communicatively connected or coupled together to form a shared or common memory. Still further, the memory can be included with other circuitry, such as portions of bus communications circuitry, in a larger circuit.

To operate effectively, the user interface 216 of the present disclosure employs an input device that moves a cursor around the display. To further enhance the user experience and to facilitate the display of, and navigation around, a database such as a movie library, a touch panel device 300 can be interfaced to the receiving device 108, as shown in FIG. 3(a). The touch panel device 300 allows operation of the receiving device or set top box based on hand movements, or gestures, and actions translated through the panel into commands for the set top box. In one embodiment, the touch panel 300 can simply serve as a navigational tool to navigate the gird display. In other embodiments, the touch panel 300 will additionally serve as the display device allowing the user to more directly interact with the navigation through the grid display of content.

Alternatively, a mouse device, a remote control with navigation features, or gesture based remote control can also be used, as will be described below.

The user interface control can be included in the receiving device 200 as part of the user interface 216 or as part of controller 214. The user interface control incorporates features useful for display and navigation through a grid representing content in a database as well for video display of content. The user interface, and more specifically the grid user interface element, is incorporated into a video media player interface that includes scripting or programming capability for manipulation of graphics. The video media player and interface can be implemented in the receiving device 200 using any combination of hardware, software, or firmware.

Alternatively, some portion of the control and video display operation can be included in the touch panel device 300 and also can be part of the information transmitted across the home the network.

In another embodiment, the input device is a remote controller, with a form of motion detection, such as a gyroscope or accelerometer, which allows the user to move a cursor freely about a screen or display. An exemplary hand-held angle-sensing remote controller 301 is illustrated in FIG. 3(b). Remote controller 301 includes a thumb button 302, positioned on the top side of controller 301 so as to be selectively activated by a user's thumb. Activation of thumb button 302 will also be referred to as a "click," a command often associated with activation or launch of a selected function. Controller 301 further includes a trigger button 304, positioned on the bottom side of controller 301 so as to be selectively activated by a user's index (or "trigger") finger. Activation of trigger button 304 will also be referred to as a "trigger," and angular movement (i.e. pitch, yaw and/or roll) of the controller 301 while the trigger is depressed will be referred to as a "trigger-drag." A trigger-drag command is often associated with movement of a cursor, virtual cursor or other indication of the user's interactive position on the display, such as a change of state (i.e., a highlighted or outlined cell), and is commonly used to navigate in and select entries from the interactive display. Additionally, a plurality of buttons 306 are provided for entering numbers and/or letters. In one embodiment, the plurality of buttons 306 is configured similar to a telephone-type keypad.

The use of a hand-held angle-sensing remote controller, such as controller 301 described in FIG. 3(b), provides for a number of types of user interaction. When using an angle-sensing controller, changes in yaw map to left-and-right motions, changes in pitch map to up-and-down motions and changes in roll map to rotational motions along a longitudinal axis of the controller. These inputs are used to define gestures and the gestures, in turn, define specific contextual commands. As such, a combination of yaw and pitch can be used to define any 2-dimensional motion, such as a diagonal, and a combination of yaw, pitch and roll can be used to define any 3-dimensional motion, such as a swing. A number of gestures are illustrated in FIG. 3. Gestures are interpreted in context and are identified by defined movements of the controller 301 while the trigger button 304 is held ("trigger-drag" movements).

Bumping 320 is defined by a two-stroke drawing indicating pointing in one direction, either up, down, left or right. The bumping gesture is associated with specific commands in context. For example, in a TimeShifting mode, a left-bump gesture 320 indicates rewinding, and a right-bump gesture indicates fast-forwarding. In other contexts, a bump gesture 320 is interpreted to increment a particular value in the direction designated by the bump. Checking 330 is defined as in drawing a checkmark. It is similar to a downward bump gesture 320. Checking is identified in context to designate a reminder, user tag or to select an item or element. Circling 340 is defined as drawing a circle in either direction. It is possible that both directions could be distinguished. However, to avoid confusion, a circle is identified as a single command regardless of direction. Dragging 350 is defined as an angular movement of the controller (a change in pitch and/or yaw) while holding trigger button 304 (i.e., a "trigger drag"). The dragging gesture 350 is used for navigation, speed, distance, time-shifting, rewinding, and forwarding. Dragging 350 can be used to move a cursor, a virtual cursor, or a change of state, such as highlighting outlining or selecting on the display. Dragging 350 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 360 is defined by two fast trigger-drag up-and-down vertical movements. Nodding 360 is used to indicate "Yes" or "Accept." X-ing 370 is defined as in drawing the letter "X." X-ing 370 is used for "Delete" or "Block" commands. Wagging 380 is defined by two trigger-drag fast back-and-forth horizontal movements. The wagging gesture 380 is used to indicate "No" or "Cancel."

In addition to traditional controls for video playback, the input device will also include a mechanism to invoke or execute at least three separate options on any element selected on the display or screen. These options will be referred to as "Additional Information", "Play" and "Additional Search". The "Additional Information", function is used to display more information about the currently selected element. The "Play" function, assuming it is available for the selected element, will select that element to be played, which can require a secondary user interface for content purchase, etc. The "Additional Search" function represents the mechanism that allows a user to use any element as a source for an additional advanced search that will generate a whole new content set, updating the entire screen based on criteria defined by the selected element. It is to be appreciated that these three options can be associated with predefined or new gestures, for example, on touch panel 300, or each option can be assigned to a predetermined button, for example, of the plurality of buttons 306 on the remote controller 301.

It is to be appreciated that at least some of the components described above in relation to FIGS. 1-3 will form an apparatus and/or system for generating the user interface.

FIG. 4 illustrates a graphical flowchart for the operation of a user interface related to the display and navigational aspects of the grid display of the present disclosure. Initially, video content 401, from either a broadcast source or the managed special source, can be displayed, in step 402. In step 404, entering the main menu of the interface can be accomplished by tapping, or otherwise, selecting on the video screen. The main menu screen can include a number of user informational elements 403, and can also include a portion of the display still displaying the previous video content 401. The video content can continue to run, or can be placed in pause mode.

Navigation into the content library can include using the search, browse, or recommend button by tapping on or otherwise selecting the desired button. In step 406, selection of the search or recommend button accesses a linear display structure 405 of certain objects within the library or database, and include additional criteria for the search or recommendation feature to restrict the coverage size of the database, including actor, genre, or title criteria. The linear grid 405 can be more useful for these access functions due to the restrictions placed on the access to the library and the reduction in searchable content.

In step 408, selecting the browse function as a navigation tool pulls up a separate two dimensional grid display 407 of content selections. The browse function provides access to the complete library or database and promotes very little restriction in navigation around the database. The grid display 407 and navigation for the library or database will be described in further detail below. An entry or selection of an element from a content display (for instance by tapping on it), after it has been highlighted or enlarged in one of the previous function operations opens a detail screen which provides further detail about the selected content entry, step 410. The detail screen also provides additional options for playing or executing, renting, recording, or buying the content as well as options to return to a previous content navigation function described above.

FIG. 5 illustrates a detail view of an embodiment of the grid display 500 using aspects of the present disclosure. Grid display 500 operates in a manner similar to the operation of grid display 407 described in FIG. 4. The grid display 500 can be displayed on the display device 114 and manipulated or navigated using the touch panel 300 or other navigation device described earlier. The interface screen can also be displayed on the touch panel device 300 as a remote display, allowing the user to more directly interact with the navigation through the grid display of content.

The grid display 500 is made up of several graphical elements 502 arranged in a two dimensional grid. The two dimensional grid can include rows and columns or include some other two dimensional pattern arrangement, such as a radial or elliptical pattern around one or more central points. In one embodiment, all of the element move together as on contiguous unit. Each graphics element 502 represents a single data entry location from the library or database of content, referred to as the model in the control software, which will be described below in relation to FIG. 7. For example, grid display 500 includes graphic elements representing movie posters. Grid displays showing graphic elements representing book covers, album or CD covers, or the like can also be used. The current item 504 is, in this case, highlighted by adjusting the appearance of the item, e.g., enlarging and centering the element in the view area. When an item is highlighted in response to a user input, additional information can be provided with the graphic element related to the specific content associated to the graphic element. Furthermore, the specific content associated with the graphic element can be executed, e.g., a movie to be played, a game to be loaded, a web site to be launched, in response to further user input.

The grid display takes advantage of screen real-estate or display area to provide additional options and context in multiple dimensions. Navigation of the grid display is not constrained to a single, typically horizontal, dimension. Data in the grid, e.g., movie content, audio content, etc., can be either arbitrarily or explicitly organized within the two dimensional space. When explicitly organized, the data or graphic elements 502 are organized according to at least one variable related to the specific content associated to graphic element. For instance, rows can represent alpha-numeric organization while columns can represent genres.

Any element 502 can be made up of images representing specific content, such as a defined frame from a piece of recorded content, an image supplied from the network or by the user, or from a library of generic elements either manually or automatically assigned to the content. Any of these elements can be augmented with text, either overlaid on the element itself or displayed along with it, and/or additional smaller elements to indicate the type of content. For example, elements representing content that is locally stored on the receiving device, such as receiving device 108 described in FIG. 1, can be presented with a small element of a disk drive in the bottom right hand corner of a large image representing the content itself. Elements are configured to be detailed enough for a user to clearly see the type of content they represent. Elements could also be in part or fully dynamically created, such as including elements of content currently playing on a broadcast channel. For example, an element can be dynamically generated (either locally or delivered from the network) of a scene from recently broadcast video, then combined with a logo or some indication of the channel on which it currently being broadcast. This would allow a user to see at a glance, what is on currently on a large number of channels at once.

FIG. 6 illustrates the user operation and navigation for the grid display using aspects of the present disclosure. Interaction with the grid display 600 shown in FIG. 6 is described in connection with the touch panel device 300 shown in FIG. 3(a). Gestures, made by a user's hand, on, or above, the touch or capacitively sensitive panel translate to messages that are communicated to the receiving device 108 via a network, such as a home network, as described in FIG. 1. The messages are translated by a controller in the touch panel device into changes processed by the set top box or receiving device. It is important to note that the messages creating changes can be interpreted by the receiving device 108 in a manner that results in different effects within the physical data structure representing the content library (known as the model) and the display structure (known as the view) portions of the implementation.

As an example, when initiating a drag motion from lower left to upper right on the touch panel, as shown in FIG. 3(a), the elements of grid 600 move such that the item in position B (element 602) moves off screen of the display device toward the upper right and is replaced by the item in position A (element 604), additionally the item in position C (element 606) moves to position A, as shown in FIG. 6. Additionally, movements can be animated on the display for smooth transition. Momentum effects can also be applied to enhance the physics of the view. For example, the rate of speed that the gesture is made can be translated into a distance by which the display is shifted through the grid and/or the grid display.

It is important to note that the touch panel interface is only one of possibly multiple input devices that could be used for input into the apparatus or system. For instance, the use of a hand-held angle-sensing controller, as shown in FIG. 3(b), provides for a number of types of user interaction.

FIG. 7 illustrates a state control diagram for the implementation of a grid display using aspects of the present disclosure. The implementation for the grid display and the interface follows a Model-View-Controller (MVC) coding structure. The Model portion 702, or database library, holds (or provides access to) the entire set of data and also correlates virtual x/y coordinates 704 with specific data items that are arranged in a two dimensional matrix. The Model portion 702 also tracks the currently selected item 706 within the dataset based on virtual coordinates (ideally centering the selected item when generated in the view). The Controller portion 708 converts mouse and other messages 710 (e.g. from a remote input device) into relative x/y coordinate changes that are submitted to the model which in-turn updates its virtual position 704. The View portion 712 subscribes to events from the Model 702 and generates the grid for a display based on updates. The View portion 712 includes position updates and item detail updates.

Additionally, the implementation can include a control interpreter for a remote input device such as a touch panel using gesture interaction. Messages from the remote input device are communicated via interface software and/or hardware to the grid display implementation and are interpreted by the Controller 708 for input into the Model 702.

A method for optimizing the display of the grid display and interface will be described in relation to FIGS. 8-13.

Initially, in step 802, a total number of items in a database of graphic elements are determined. The data or graphic elements are arranged in a two dimensional array which correlates to a two dimensional grid in virtual space. The extent of the virtual space depends on the height and width of the individual grid elements multiplied by the number of rows and columns of data in the data set. Additionally, the dataset need not be arranged symmetrically in the horizontal and vertical dimensions. Each data item in the data set contains at least one of an image, title, rating, and uniform resource locator (URL), and other metadata related to a specific piece of content, in the example described above, a feature film.

FIG. 9 illustrates an embodiment of a data structure 900 using aspects of the present disclosure. Data structure 900 can include an array of a plurality of data elements arranged based on a pattern for display. For example, data structure 900 can include a dataset of 6400 items with the data elements arranged in an array of 80 columns by 80 rows (row and column dimensions need not be identical).

Data structure 900 illustrates the two dimensional indexing for each data element 902 as it relates between the display area on a display and the array. As an exemplary illustration of the embodiment, the virtual dimensions for a grid containing 80×80 elements each with a visual dimension of 150×200 pixels would result in a virtual space of 12,000×16,000 pixels. Rather than load images for all 6400 items in a plane 12,000× 16,000 pixels, the method of the present disclosure would generate only a fraction of the total space, i.e., a first subset of graphic elements, step 804. This is accomplished by selecting a "window" into the dataset that constitutes the visible area plus an additional border area to facilitate enough caching to support smooth navigation into adjacent areas of the grid, step 806. FIG. 10 illustrates a single element border 1002 around the visible area 1004. As will be described in more detail below, all elements 1001 within border 1002 are generated but only the elements 1003 within the area 1004 are visible. In cases where it is desirable to catch a full screen's worth of information in any direction, to support a quick gestural move across an entire screen width, the border area 1002 could be increased.

A loading priority for the data (such as images) can be established. The images should be loaded in priority from center outward to the edge of the border 1002. As direction of movement is known image loading priority is weighted to the elements coming into view over those leaving the view. FIG. 10 further illustrates the visible area 1004, the border area 1002 and the non-generated virtual data space 1006. Generated visual elements are labeled AA (element 1001), BA (element 1005), etc. It is to be appreciated that graphic elements, e.g., element 1007, in the virtual data space 1006 are not generated but are designated to a container or placeholder. As element 1007 enters area 1002 in response to a user input, the container will be loaded and the graphic element associated to same will be loaded or generated.

In step 808, a portion of the first subset of graphic elements will be displayed. As shown in FIG. 10, the elements in the visible area 1004 are generated and visible on the display, while the elements in the pre-generated border area 1002 are generated but not visible on the display. In step 810, the position of at least one graphic element in the first subset is adjusted to a point central on the display in response to a user input and a second subset of graphic elements is displayed with the at least one graphic element at the central point, step 812. It is to be appreciated that as the elements are moved, elements in the border area 1002 will appear quickly in the visible area 1004 since there are already generated. For example, if a user selected element CE (37, 25) and dragged the element to the upper left, at least element GC (41, 23) would move into the border area 1002 and out of the visible area. Additionally, at least element AG (35, 27) will move from border area 1002 to visible area 1004, the transition appearing seamless since element AG was already generated and cache in the border area.

Special exceptions can be handled, such as in the case where an edge or corner data is approached. The grid display should be configured to avoid navigating beyond the edge. The terminal position for an edge should ideally be centered in the view (and emphasized as the selected item), as illustrated in FIG. 11. Here, element 1, 1 (element 1101) is centered in the visible area 1004. Even if the user attempts to select element 1, 1 (element 1101) and move in a direction toward the lower right hand corner of the display, the elements will stay in the same position, or be locked. In this manner, the user input will not result in a blank screen.

FIG. 12 is a flow chart of the optimization process for displaying a portion of a larger database or library in a grid display using aspects of the present disclosure. The optimization involves reusing visual elements rather than allocating and de-allocating them as needed. In step 1202, the method starts and proceeds to position an element based on a change, step 1204, i.e., in response to a user input. In step, 1206, it is determined if the element's position exceeds the boundary area 1002. When a display element moves outside the pre-generated border area 1002, the element is moved to the opposite edge of the border area, step 1208. In step 1210, the view element queries the model for data relevant to its new position in virtual space. The virtual space location is determined by the current virtual location offset by the actual display coordinates.

FIG. 13 shows an illustrative embodiment of the movement of the display elements in the grid display following a response to a user input to shift the window of displayed elements with the database or library. The display diagram illustrates how visual elements on the top and right side shift to the bottom and left side to fill in as the grid is moved in a diagonal direction. For example, element IB 1302 on the right shifts its physical position to IB' 1304 on the left. As part of this transition the visual element queries the model to obtain data relevant to the new virtual position (in the case of IB' 1304 that would be data element 34, 22). In the case of visual element IA 1306 there are actually two moves, one from right to left resulting in IA' 1308 and another from the top to the bottom resulting in final location of IA" 1310. In this manner, when an element moves into the border area 1002, it is moved to another position in the border area so the underlying container or placeholder for the data or graphic element does not need to be unloaded. The container will be re-used but only the graphic element would need to be loaded which is less resource intensive than having to load a new container.

The grid display of the present disclosure can be used to browse multiple hundreds or even thousands of items, e.g., content such as movies. Generating a visual element for each element can be processor intensive. The techniques of the present disclosure provide for minimizing the number of display elements required for generating a grid display view while maintaining the illusion of navigating a larger virtual space of information.

An embodiment of software code that can be used to operate a video display with a touch activatable screen as described above can be found in Provisional Patent Application No. 61/515,578 and in PCT/US2010/049772. The software code represents a means for enabling and implementing the various inventive features taught herein, the aforesaid various inventive features not having been known at the time PCT/US2010/049772 was filed. The software code is exemplary, and it is understood by those skilled in the art that other software code can be developed for implementing the inventive features taught herein. Accordingly, the noted software code is deemed to be understood by those skilled in the art and does not need to be repeated herein.

Described thus far, is an apparatus and method for displaying and navigating through a database or library of elements representing available content. The elements can be image objects such as album covers or movie posters. The structure arranges the objects in a grid display for taking advantage of the two dimensions of a display, i.e., the vertical dimension along with the horizontal dimension, for navigation purposes. The navigation aspects associated with the user interface include gesture based movements translated into display changes for the cover grid. Optimizations to the view of a grid display implementation are described such that the number of display elements is minimized and independent of the number of items in the full dataset and that navigation through the database is smooth and efficient with respect to the visual perception of the displayed portion.

Having described presently preferred embodiments of an apparatus, method and user interface for grid navigation, which are intended to be illustrative and not limiting, it is noted that modifications and variations can be made by persons skilled in the art in light of the above teachings.

SUMMARY OF THE INVENTION

A new user interface and display system for a video display device with a touch screen makes it possible to peek at, that is, view briefly, a second or favored video content while watching a first video content. During a video peek, video from a second video source will be seen to partially displace and temporarily replace a portion of a video presently being viewed. Selection of the other video sources can be controlled, for example, by swiping with one, two, three or four fingers or finger tips, and by swiping inwardly from any one of the edges of a video display. Moreover, the video presently being viewed can be interchanged with the video being peeked at.

Patents, published applications and articles of interest related to aspects of video peeking beyond basic touch screen operation include: U.S. Pat. No. 7,864,163B2, related to displaying at least a portion of a structured electronic document on the touch screen display, wherein the structured electronic document comprises a plurality of boxes of content, and detecting a first gesture at a location on the displayed portion of the structured electronic document so that a first box in the plurality of boxes at the location of the first gesture is determined. The first box on the touch screen display is then enlarged and substantially centered; US2010077433A1, related to a method for displaying program content from a subscription television service on a display and receiving a signal to initiate a multi-panel browsing mode on the display. The method includes displaying a multi-panel view on the display, the multi-panel view including a panel with the program content and a panel with top program based on top program information received from the server. Additional panels included in the multi-panel view may include interactive games or other content available from the subscription television service; US2003126605B1 related to an interactive television system designed to populate an electronic program guide (EPG), which provides Video-Clip Previews on Demand by automatically launching a video clip preview, after browsing and navigating through the EPG's grid guide to a highlighted program titled cell, and remaining at such highlighted cell for a predetermined delay. The display process is a "No-Touch Display" process requiring no selections by the viewer while browsing; and, "INDIRECT MULTI-TOUCH INTERACTION FOR BRUSHING IN PARALLEL COORDINATES", Kosara, R., Univ N Carolina, VISUALIZATION AND DATA ANALYSIS 2011|7868:-2011, SPIE-INT SOC OPTICAL ENGINEERING related to the use of multi-touch interaction to provide fast and convenient interaction with parallel coordinates by using a multi-touch trackpad rather than the screen directly so the user's hands do not obscure the visualization during interaction, wherein the user employs one, two, three, or four fingers on the trackpad to perform complex selections in a data set.

The inventive arrangements for video peeking are, for example, a substantial improvement over picture-in-picture (PIP) functionality because a PIP picture is so much smaller that the PIP picture has less resolution, and because making the PIP picture larger compromises the relative completeness of the primary video source, or main picture. Picture-in-picture functionality also does not provide for video from a secondary video source appearing to flow inwardly from the sides of a video display and does not provide automatic disappearance of the video from a secondary video source in an oppositely appearing flow. On the contrary, PIP displays must be turned on and turned off by separate actuations of a remote control. The same deficiencies are generally true for picture-outside-picture (POP) functionality.

A user interface in accordance with the inventive arrangement comprises: a touch activatable screen; a touch screen processor capable of detecting swiping motions across areas of the screen, including distinguishing between at least one or more of different directions of the swiping motions, different lengths of the swiping motions and different widths of the swiping motions; a video signal processor for selectively supplying a first video image to the screen and for selectively supplying at least one of a plurality of other video images to the screen; the at least one of the plurality of other video images being selectively supplied to the screen for a given interval of time responsive to a swiping motion across the screen occurring within given ranges of the directions, the lengths and the widths; and, the other video image being supplied to the screen being displayed instead of a portion of the first video image.

The touch screen processor is preferably capable of detecting swiping motions across areas of the screen, including distinguishing between at least two of different directions of the swiping motions, different lengths of the swiping motions and different widths of the swiping motions. The touch screen processor of is also preferably capable of detecting swiping motions across areas of the screen, including distinguishing between each of different directions of the swiping motions, different lengths of the swiping motions and different widths of the swiping motions.

The other video image is preferably supplied to the screen by displacing the portion of the first video image in a sweeping motion that generally corresponds to the direction of the swiping motion. At the end of the interval of time, the other video image being supplied to the screen preferably recedes from view in a sweeping motion that generally corresponds to a direction opposite to the direction of the swiping motion.

The screen of most if not all display devices has discernible sides and each side of the screen is a starting point for at least one, two, three or more of the swiping motions.

In a presently preferred embodiment taught herein, each swiping motion is characterized by at least one or more of a point of origin of the swiping motion, swiping widths, swiping directions, and swiping lengths. Various combinations of the characteristics of the swiping motions can preferably result in different ones of the plurality other video images being selectively supplied to the screen. For example, if the screen is generally rectangular, the different combinations of the swiping widths and the swiping directions can provide the other video images selected from any one of at least eight different video sources.

Further control can be provided in accordance with the inventive arrangements. For example, the maintenance of pressure on the screen at the end of a swiping motion for a given time interval can result in the other video image being substituted for the first video image. Alternatively, a swiping motion longer in length than is necessary to initiate displaying one of the other video images on the screen results in the one of the other video images being substituted for the first video image.

The inventive arrangements can also be embodied in a method for controlling a video display having a touch activatable screen, comprising the steps of: displaying a first video image on the screen; detecting a swiping motion across a first area of the screen; distinguishing between different possible origins of the swiping motion, different possible directions of the swiping motion and different possible widths of the swiping motion; selecting at least one of a plurality of other video images responsive to the distinguishing step; supplying the selected video image to the screen for a given interval of time instead of a portion of the first video image; and, upon expiration of the interval of time, terminating the supplying step.

With regard to distinguishing at least one range of length of the swiping motion, the inventive arrangements preferably comprise: initiating the supplying step responsive to detecting a first length of the swiping motion occurring within a first range of lengths; and, substituting the selected video image for the first video image responsive to detecting a second length of the swiping motion occurring within a second range of lengths exclusive of the first range. Alternatively, the method can comprise the step of substituting the selected video image for the first video image responsive to detecting a user input other than the swiping motion.

In a presently preferred embodiment, the supplying step further comprises the step of gradually replacing the portion of the first video image by moving the selected video image in a direction that generally corresponds to the direction of the swiping motion, whereas the terminating step comprises the step of gradually replacing the selected video image with the portion of the first video image by moving the selected video image in a direction that is generally opposite to the direction of the swiping motion. In general, the method preferably comprises the step of associating different ones of the plurality of the other video images with different combinations of the different possible origins, directions and widths of the swiping motion.

BRIEF DESCRIPTION OF THE DRAWINGS

FIGS. 1-3 and the accompanying description explain the general operation of a video tablet, in the context of methods and apparatus for grid navigation in the video tablet, including a touch activatable user interface.

In the drawings, wherein like reference numerals denote similar elements throughout the views:

FIG. 1 is a block diagram of an exemplary system for delivering video content in accordance with the present disclosure;

FIG. 2 is a block diagram of an exemplary receiving device in accordance with the present disclosure;

FIG. 4 is a graphical flowchart of operation of an exemplary user interface in accordance with an embodiment of the present disclosure;

FIG. 5 illustrates an exemplary embodiment of a user interface of the present disclosure;

FIG. 6 illustrates user operation and navigation of a user interface in accordance with an exemplary embodiment of the present disclosure;

FIG. 7 illustrates a state control diagram for an exemplary embodiment of a user interface in accordance with the present disclosure;

FIGS. 17(a)-17(e) sequentially illustrate video peeking in accordance with the present disclosure, wherein for purposes of this application, color pictures are depicted in gray scale.

It should be understood that the drawings are for purposes of illustrating the concepts of the disclosure and do not necessarily represent the only possible configuration for illustrating and implementing the disclosure.

DETAILED DESCRIPTION

The inventive arrangements provide a user interface and display system for a video display device that makes it possible to peek at first, and perhaps favored video content while watching other content, referred to herein as video peeking. Such video displays can include, for example and without limitation, video tablets, video pads, smart phones, electronic books, laptop computers, computer monitors and various television apparatus, that are capable of receiving video content from multiple video sources and that can be disposed close enough to a user for touch screen activation and control. The video content can also be thought of more generally as primary and secondary videos or video sources; or as a first video source and a plurality of other video sources. Swipe commands on a touch screen interface can, for example, enable a user to peek at video from one of a plurality of other video sources for an interval of time.

In accordance with the inventive arrangements, video from one of the other video sources will be seen to partially displace and temporarily replace a portion of the video being viewed with a portion of the other selected video. Selection of the other video sources can be controlled, for example, by swiping with one, two, three or four finger tips. Selection of the other video sources can be further controlled, for example, by swiping inwardly from any one of the four edges of a rectangular video display. In this manner, for example, a user can easily peek at video from any one of sixteen other or secondary video sources while viewing a video from a primary or first video source, based on how many finger tips are swiped at the same time and based on which side of the video display the swipes originate. Moreover, the touch screen can be further programmed to enable interchanging "peeked at" video from a secondary source with what was previously the video from the primary video source. This interchange can, for example and without limitation, be implemented with a longer swipe than needed for a peek. The video from what then becomes a secondary source can thus become swipeable.

Video peeking is explained in more detail in conjunction with FIGS. 14-17. In a fundamental embodiment of video peeking, a user viewing a first video (or first video content) from a first video source, can enable video from one of a plurality of other video sources (or a second video content) to smoothly, partially displace and temporarily replace a portion of the video being viewed with a portion of the other selected video, automatically followed by a smooth disappearance of the other selected video. The content of the first video source can also be thought of as a primary video source.

Figure 1:
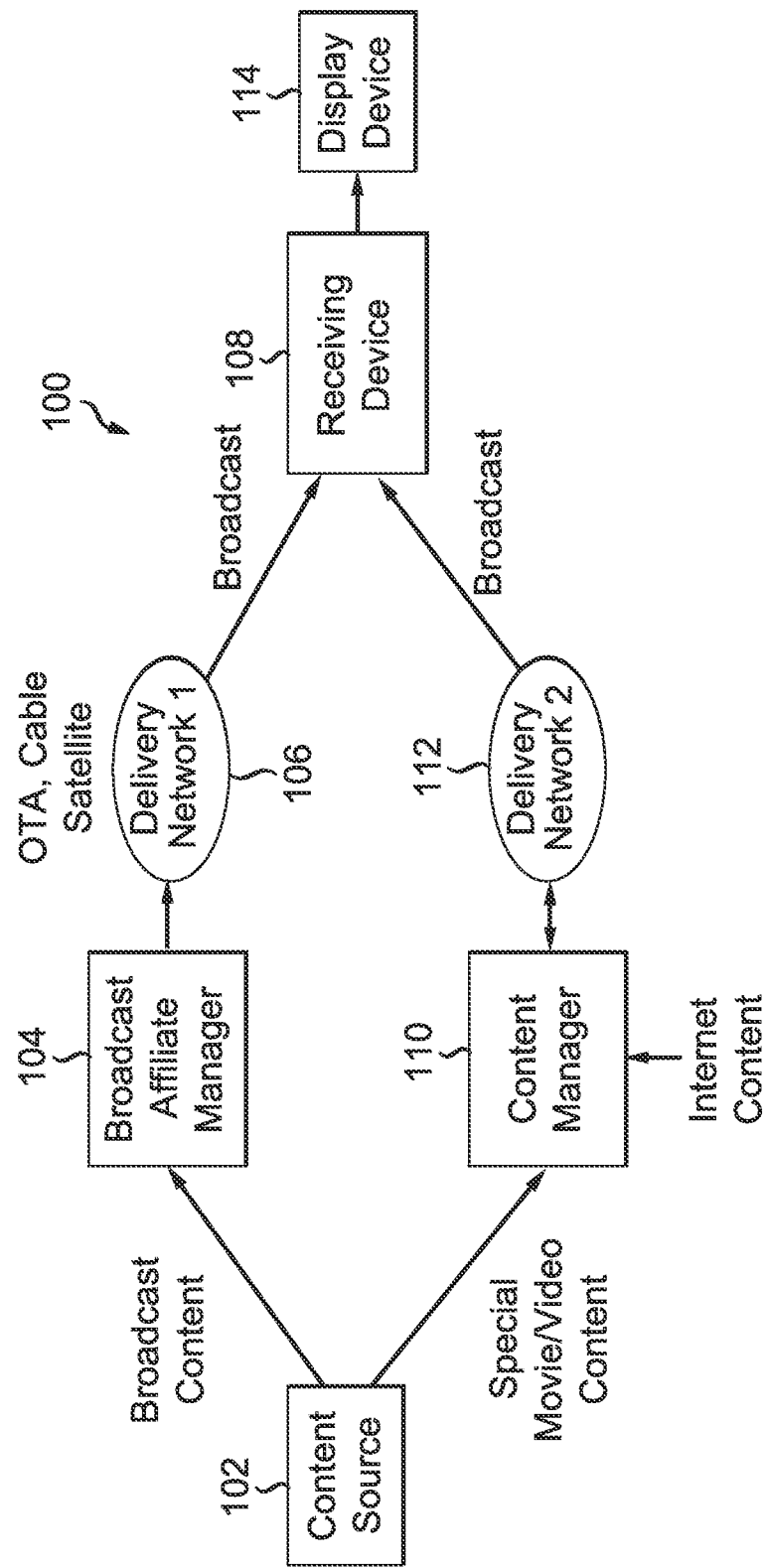
Figure 2:
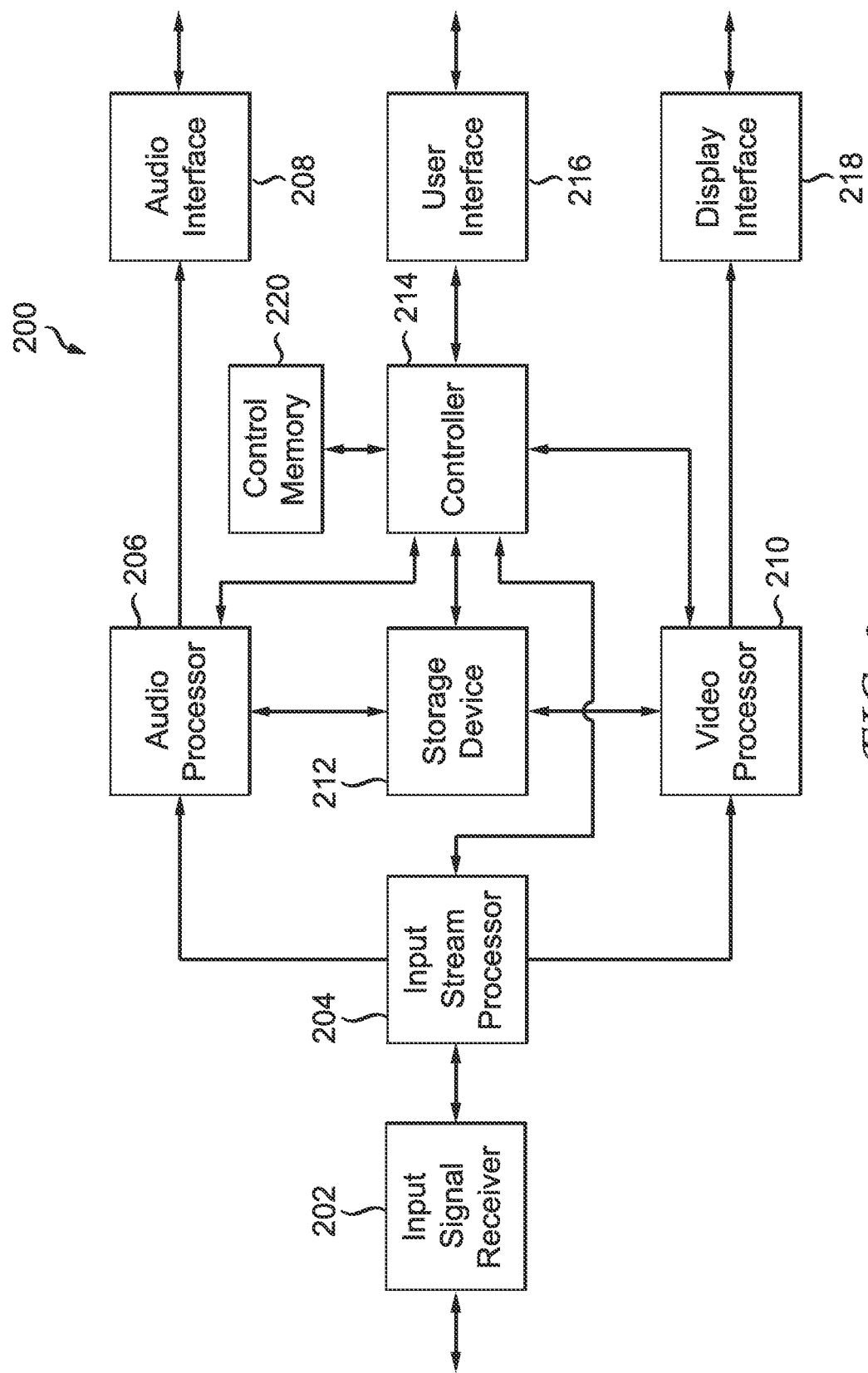
Figure 3A:
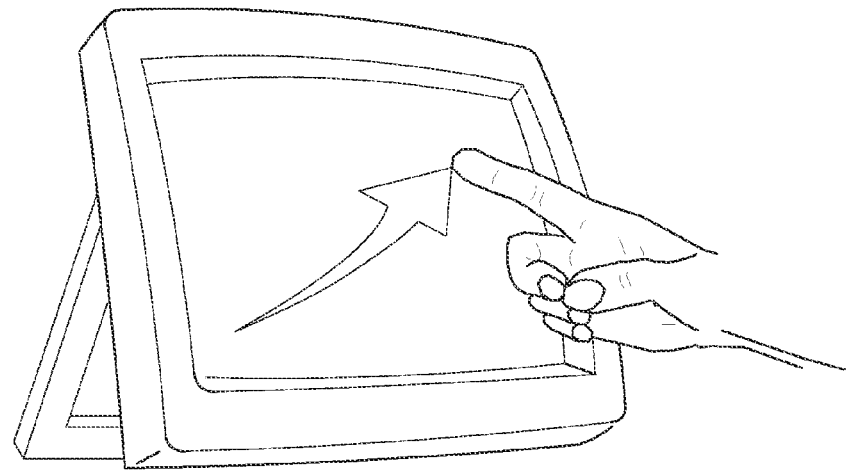
FIG. 3(a) is a perspective view of a touch panel in accordance with the present disclosure.
Figure 3B:
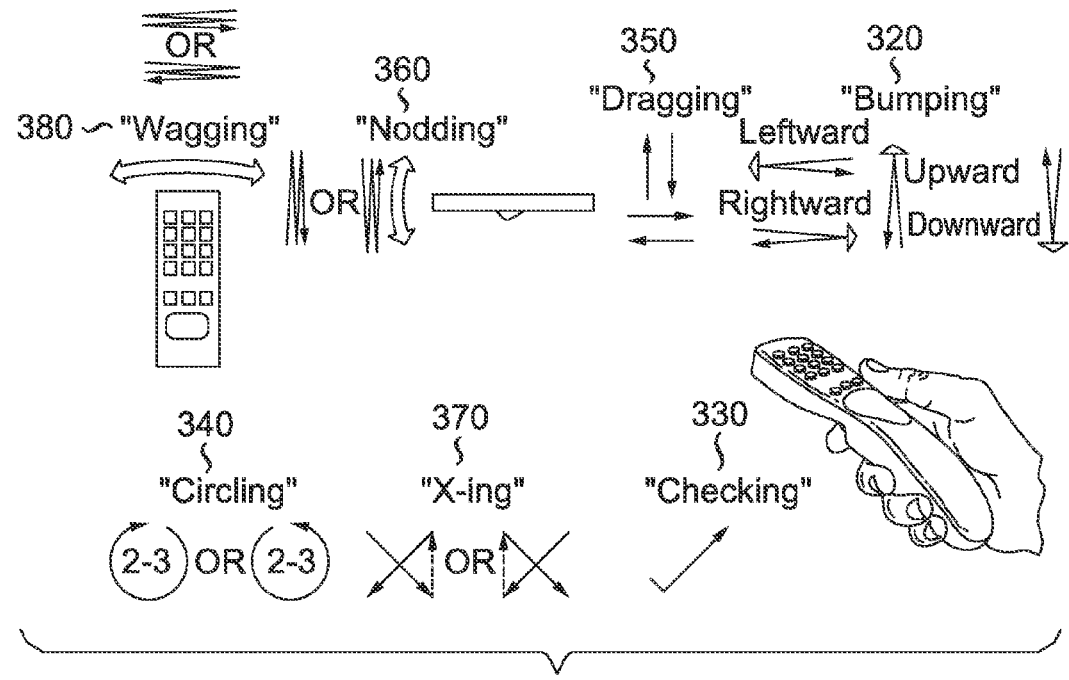
FIG. 3(b) includes a perspective view of a wireless handheld angle-sensing remote controller and illustrates a number of exemplary gestures performed with the remote controller.
Figure 4:
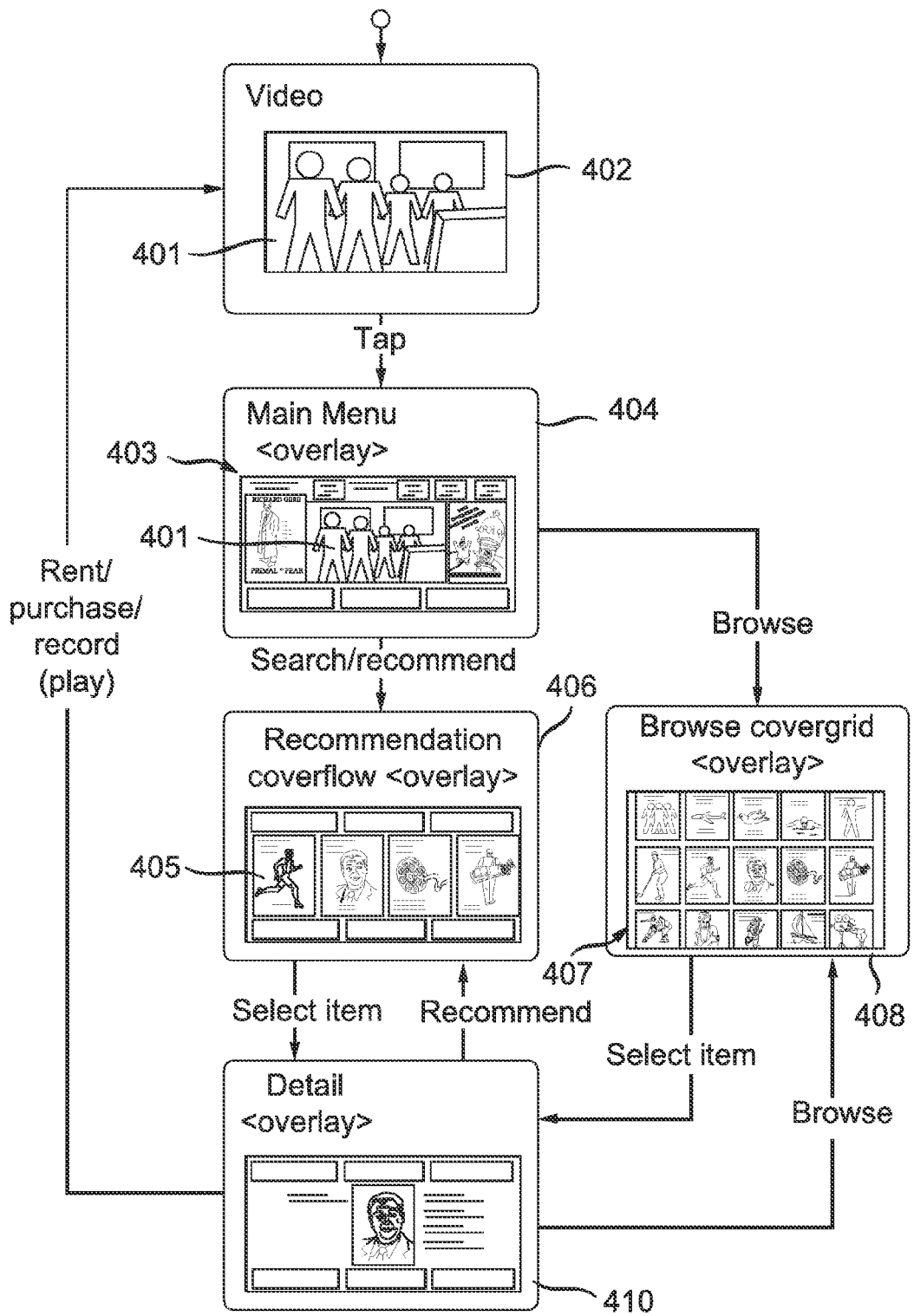
FIGS. 4-7 and the accompanying description explain methods and apparatus for implementing the "video peeking" feature described above.
Figure 5:
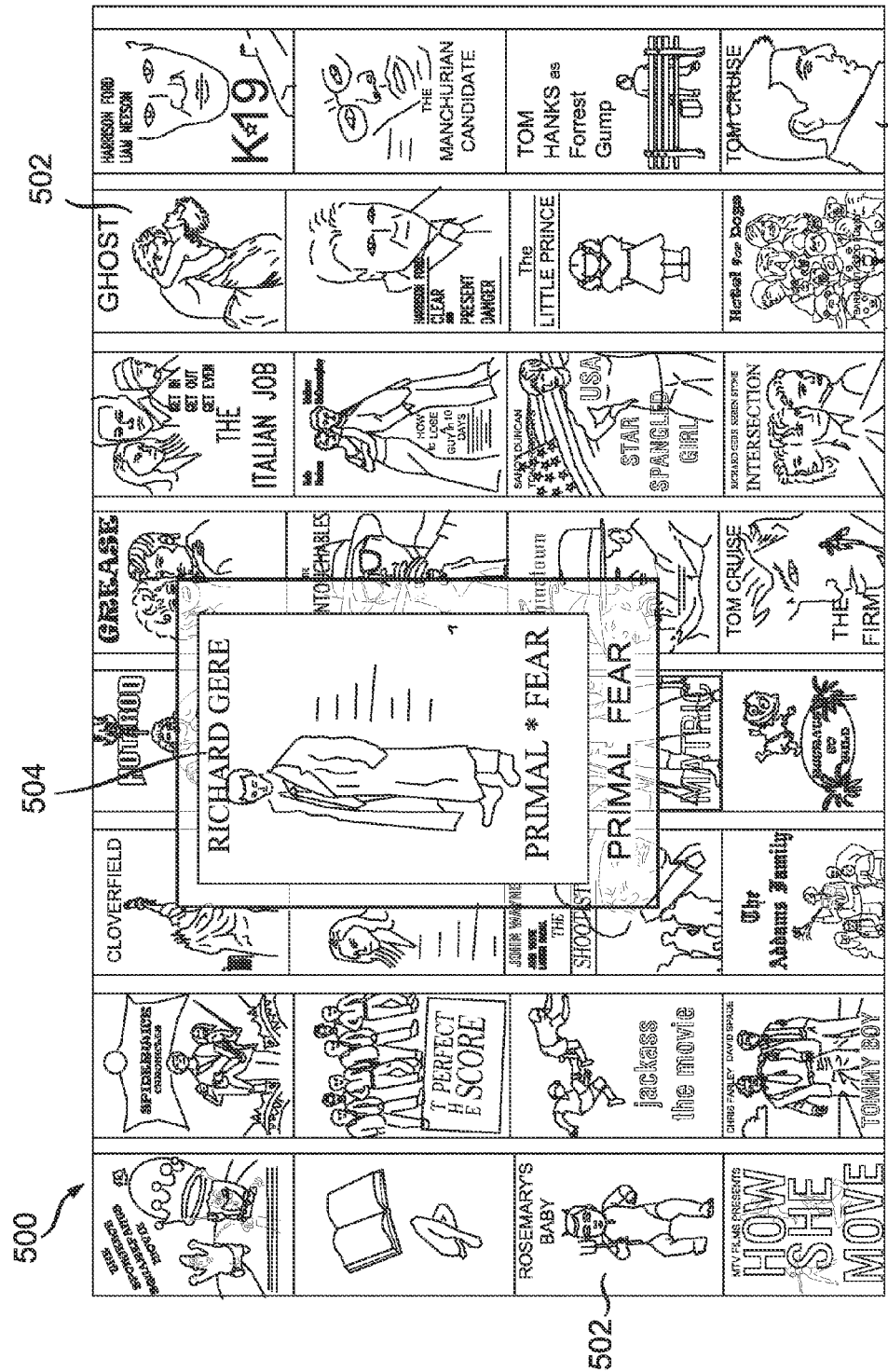
Figure 6:
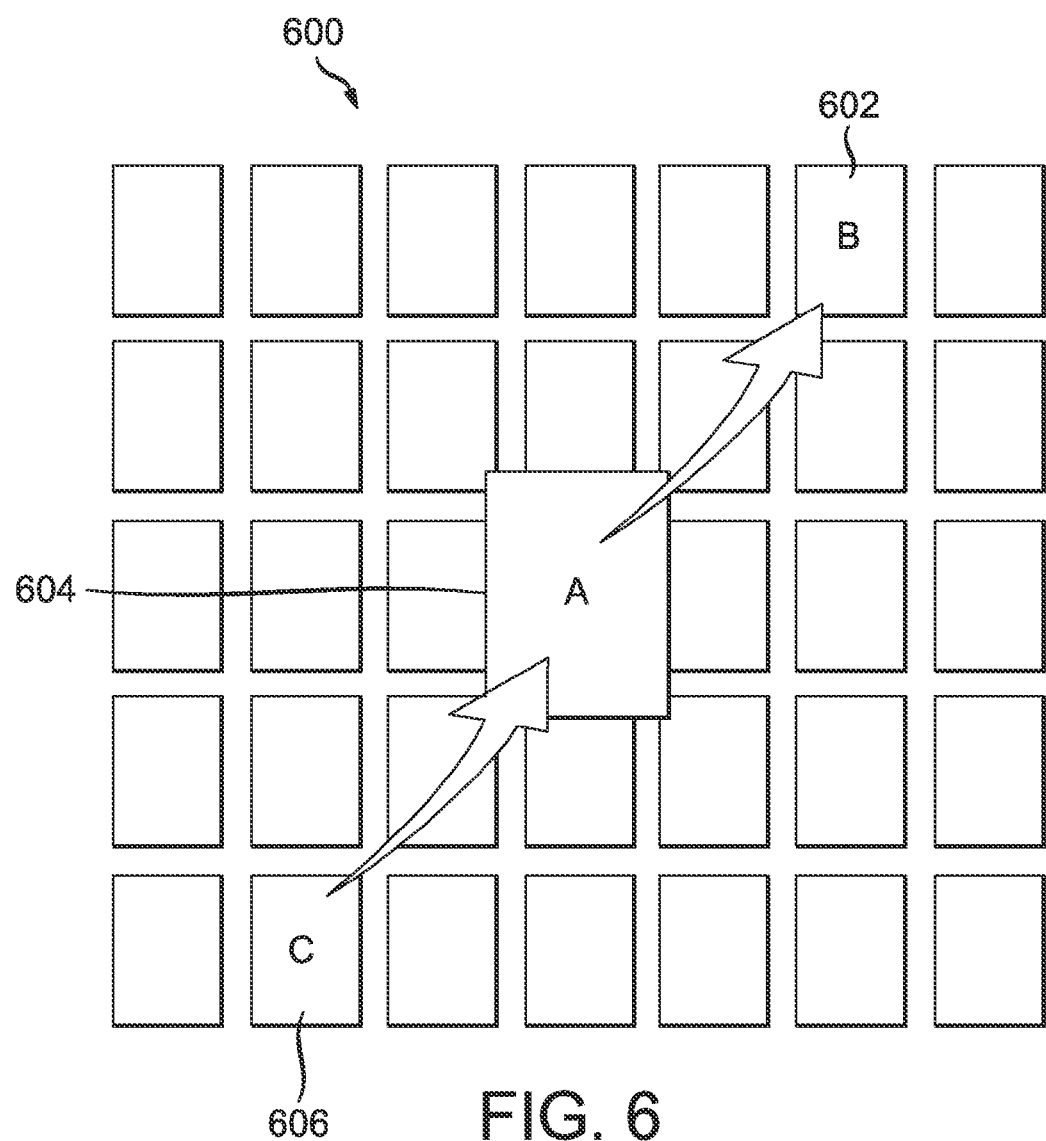
Figure 7:
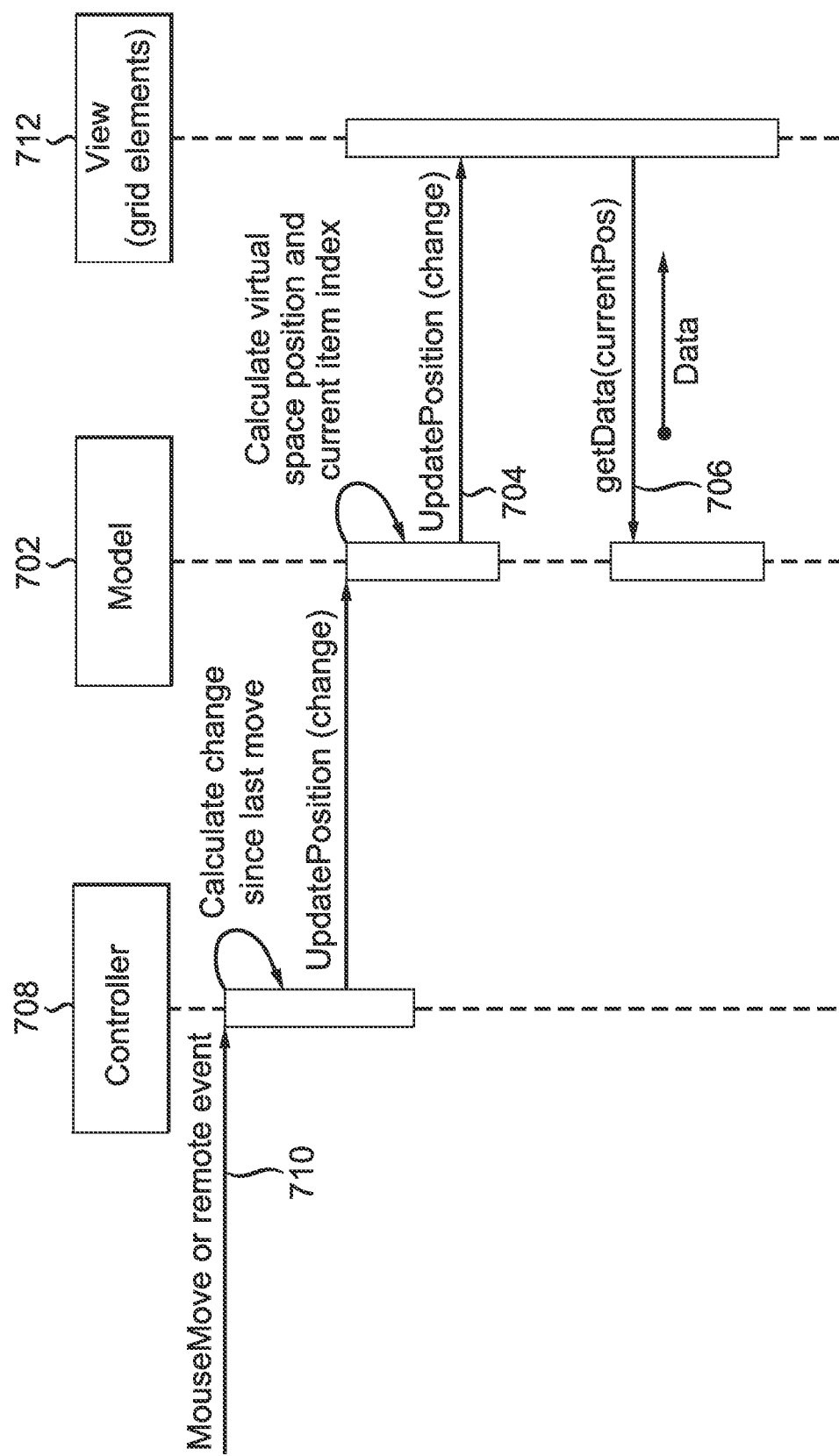
Figure 8:
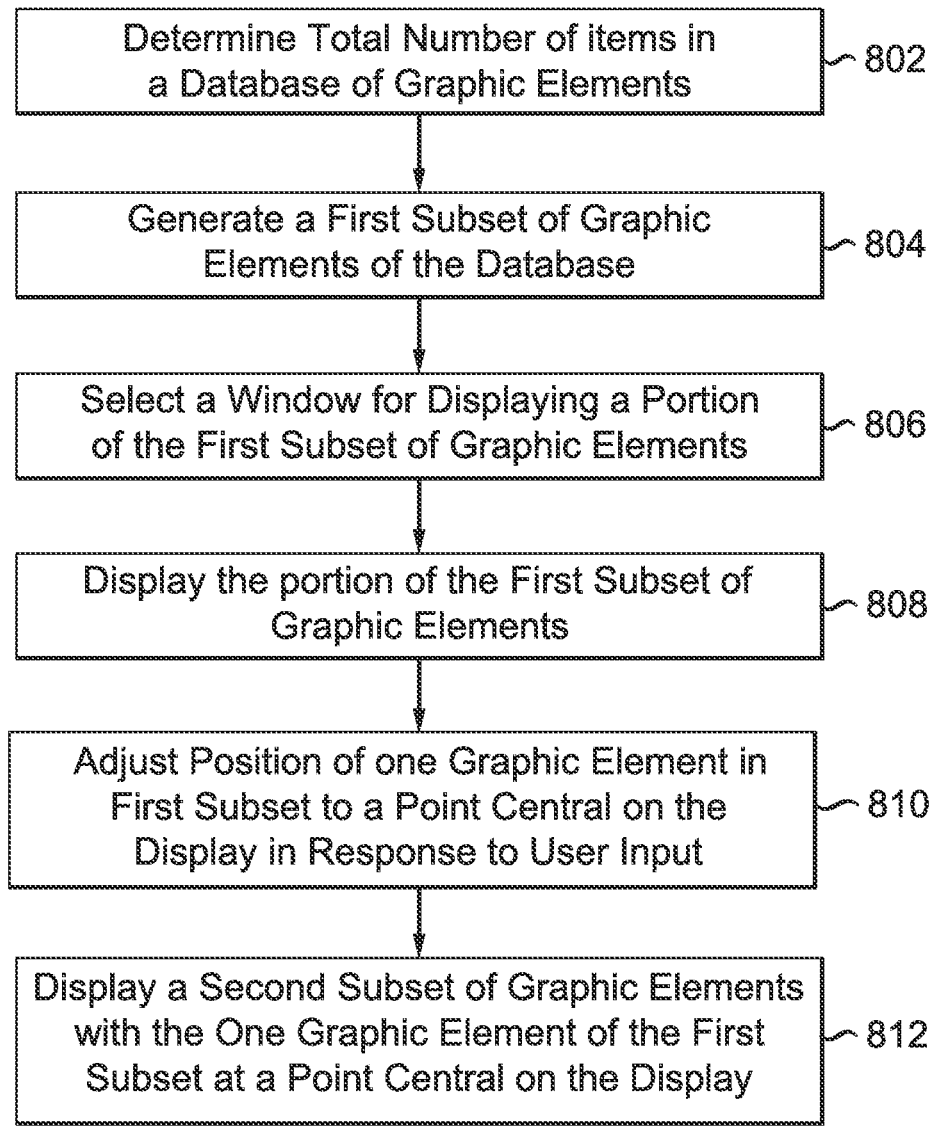
FIG. 8 is flowchart of an exemplary process for optimizing the user interface in accordance with an embodiment of the present disclosure.
Figure 9:
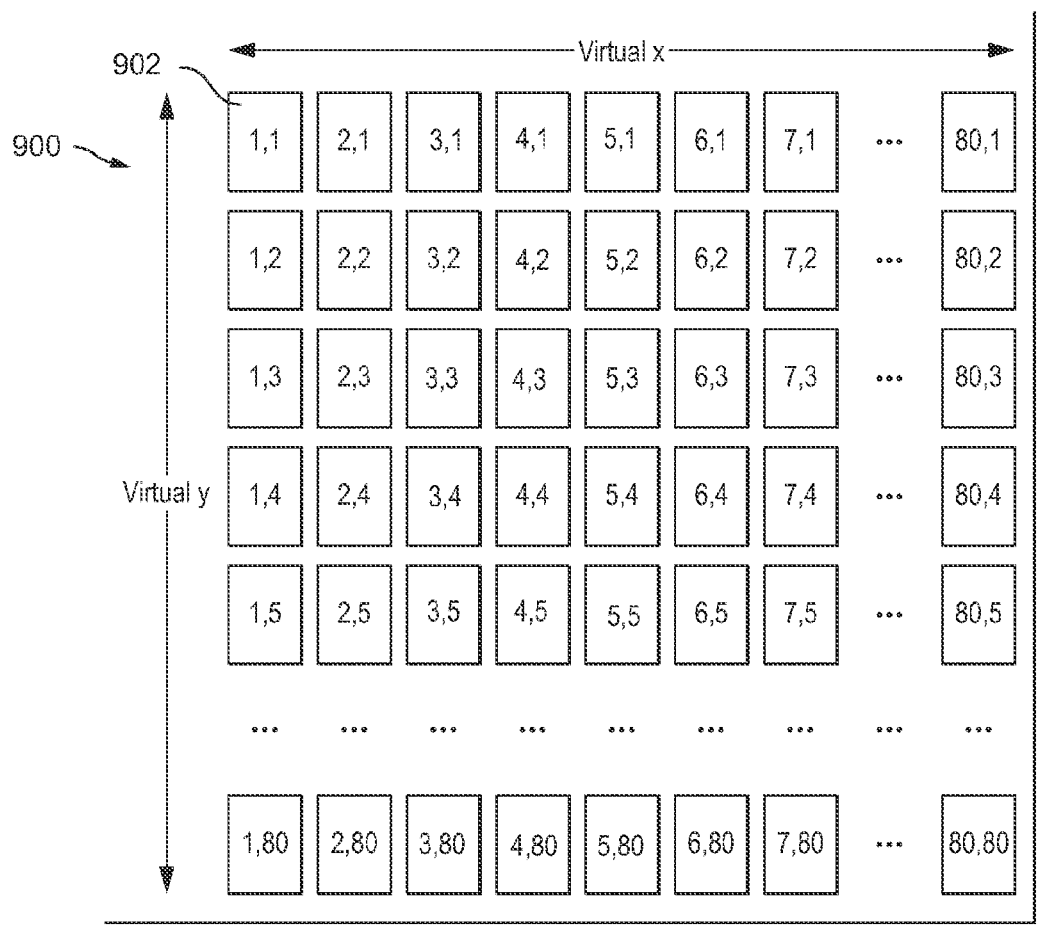
FIG. 9 illustrates two dimensional indexing for each data element of the user interface.
Figure 10:
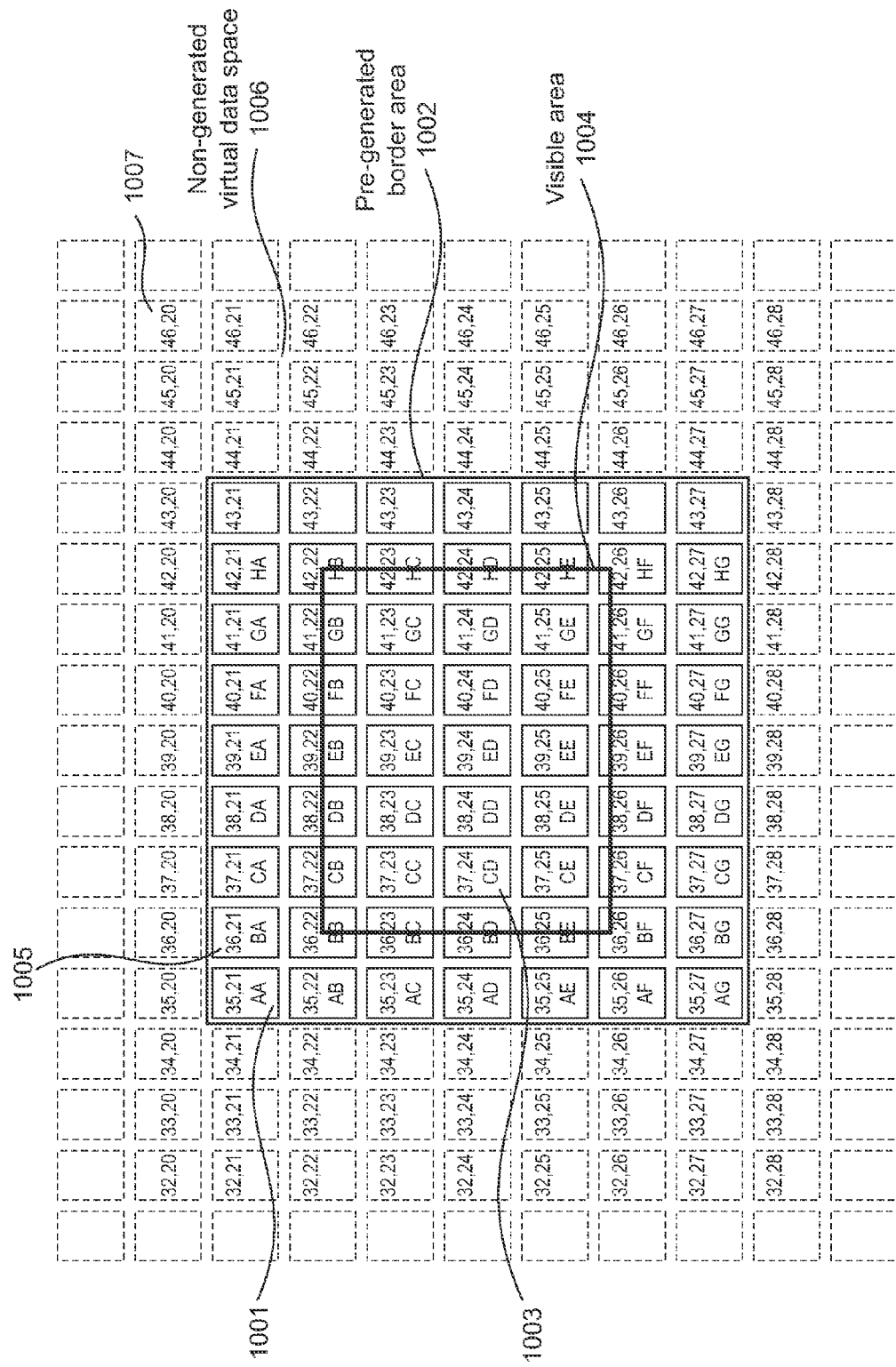
FIG. 10 illustrates a visible area window and border area of generated graphic elements for a user interface in accordance with an exemplary embodiment of the present disclosure.
Figure 11:
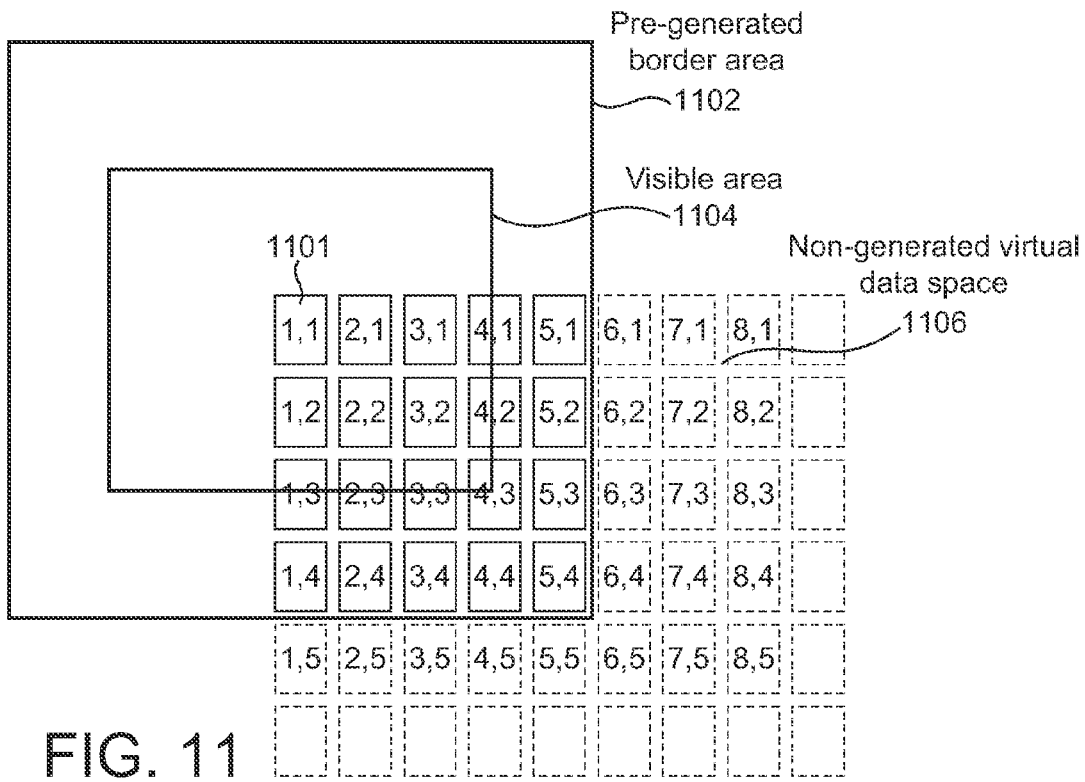
FIG. 11 illustrates a view of a user interface in accordance with an exemplary embodiment of the present disclosure.
Figure 12:
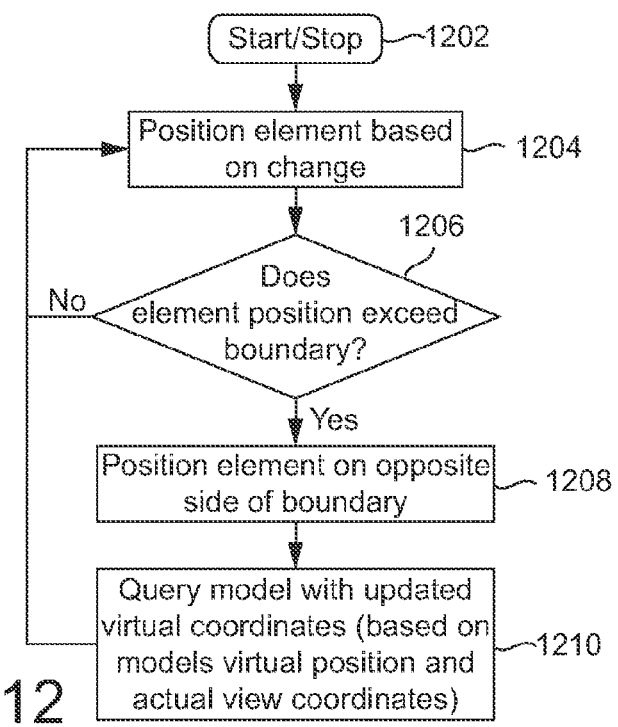
FIG. 12 is flowchart of an exemplary process for optimizing the user interface in accordance with another embodiment of the present disclosure.
Figure 13:
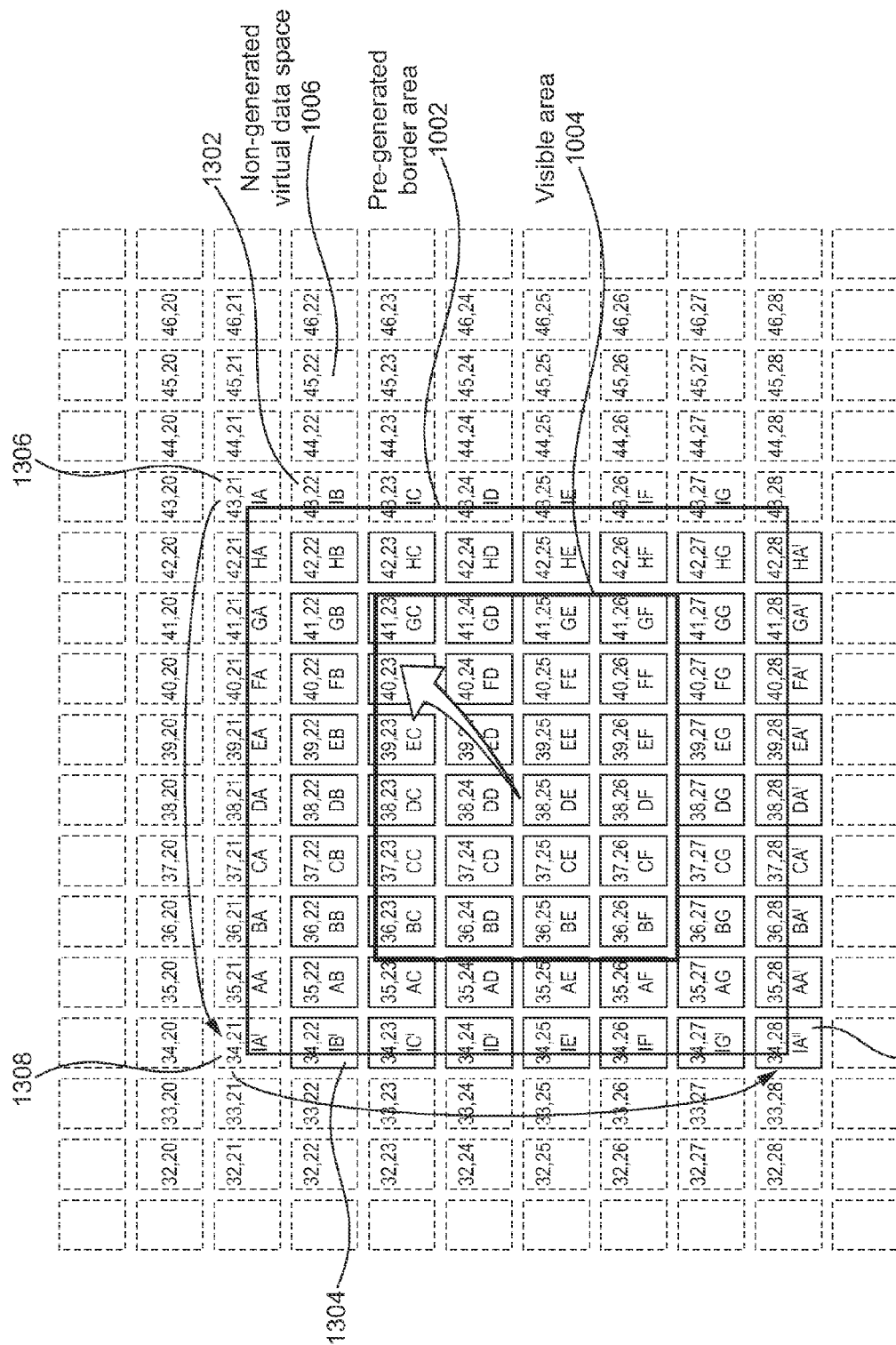
FIG. 13 illustrates movement of graphic elements in a grid of a user interface in accordance with an exemplary embodiment of the present disclosure.
Figure 14:
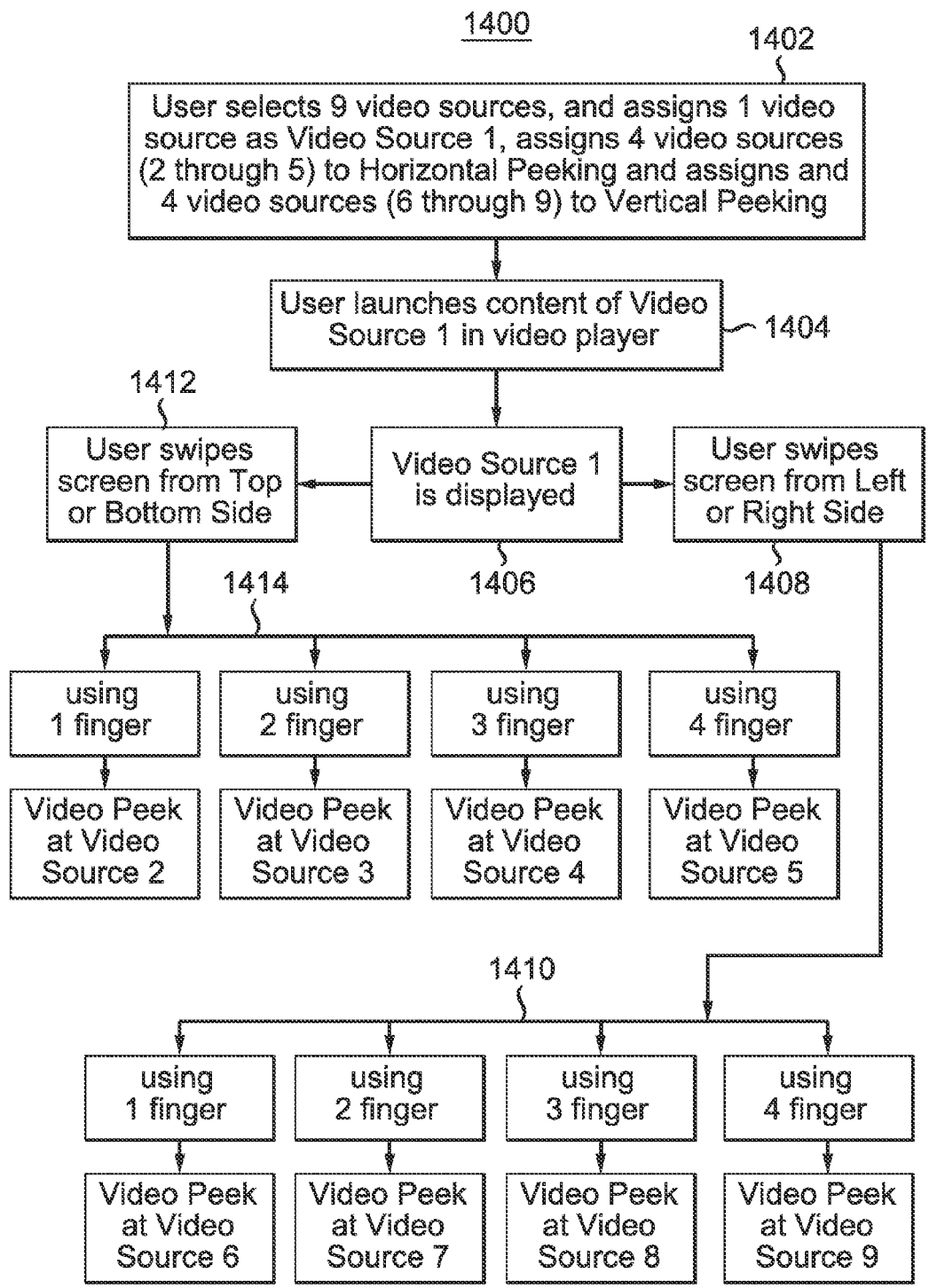
FIG. 14 illustrates a video display useful for explaining the user interface of an exemplary embodiment in accordance with the present disclosure.

FIG. 14 is a flow chart 1400 that illustrates the use of swiping as described above to implement and control video peeking at selected video sources in a video tablet or similarly capable device. At step 1402 a user selects a plurality of video sources that can be viewed in accordance with the inventive arrangements. These sources of video content can be thought of as "favorite" or "preferred" sources the user expects to view from time to time by video peeking in accordance with the inventive arrangements, while viewing the video content of yet another source altogether. As noted in the flow chart the viewer can assign a first video source denoted as Video Source 1; can assign 4 further video sources (2 through 5) to Horizontal Video Peeking, as Video Sources 2 through 5; and can assign 4 further additional video sources to Vertical Video Peeking, as Video Sources 6 through 9. Thus, when the user launches the display of Video Source 1 in accordance with step 1404, and Video Source 1 is displayed in accordance with step 1406, the user has available a set of eight different channels or sources of video content that can be briefly viewed by video peeking, without completely interrupting the display of Video Source 1. A user can then choose to implement horizontal video peeking by utilizing horizontal screen swiping from the left or right edges or sides of the video display in accordance with step 1408, or by utilizing vertical screen swiping from the top or bottom edges or sides of the video display in accordance with step 1412.

As indicated by the blocks associated with reference numeral 1410, horizontally swiping one, two, three or four fingers will initiate a video peek at video content or video sources 6, 7, 8 and 9, respectively. As indicated by the blocks associated with reference numeral 1414, swiping one, two, three or four fingers vertically will initiate a video peek at video content or video sources 2, 3, 4 and 5, respectively. It will be appreciated that many types of video displays have been, and are provided with the ability to rotate video content to compensate for rotation of the video display device. It will be appreciated that the inventive arrangements will be operable with such rotational control.

In the embodiment shown in FIG. 14 the number of other sources of video content are four sources that can be displayed responsive to left or right directional swiping and four sources that can be displayed responsive to up or down directional swiping. The number of sources in FIG. 14 is not limiting for purposes of the invention. In fact, for example, left-only and right-only directional swiping and up-only and down-only directional swiping can invoke any one of sixteen other sources of video content for video peeking. However, the number of other sources of video content will be limited as a practical matter by certain practical and personal issues. One such issue is how many combinations of directions and numbers of fingers can be remembered by any given user. Another such issue is the manual dexterity of the user. It will therefore be appreciated that with respect to flow chart 1400, selecting fewer than eight other sources of video content is still within the scope of the inventive arrangements. Indeed, even video peeking a single other source of video content is within the scope of the invention.

Figure 15:
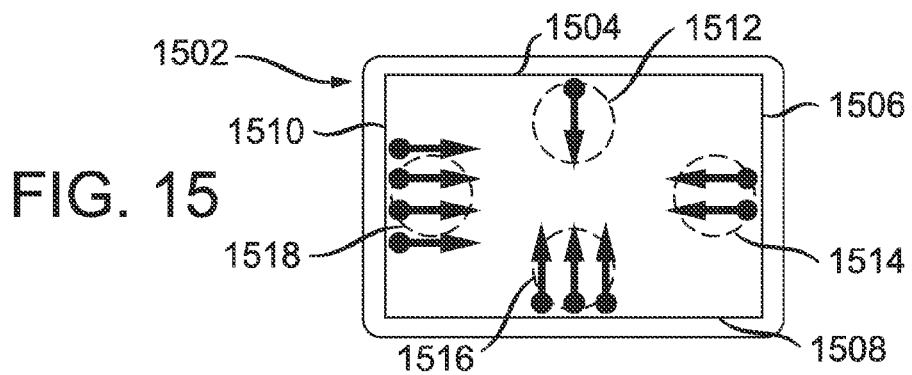
FIG. 15 illustrates exemplary single and multiple finger swipes of respective widths corresponding to one, two, three and four fingers in accordance with the inventive arrangements.
Figure 16A:
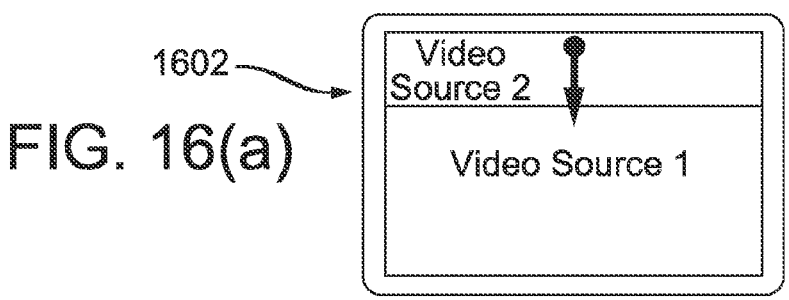
FIGS. 16(a)-16(d) illustrate various video display alternatives in accordance with the flowchart shown in FIG. 14.
Figure 16B:
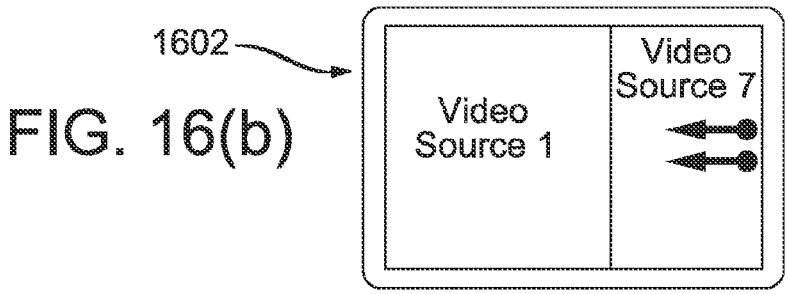
Figure 16C:
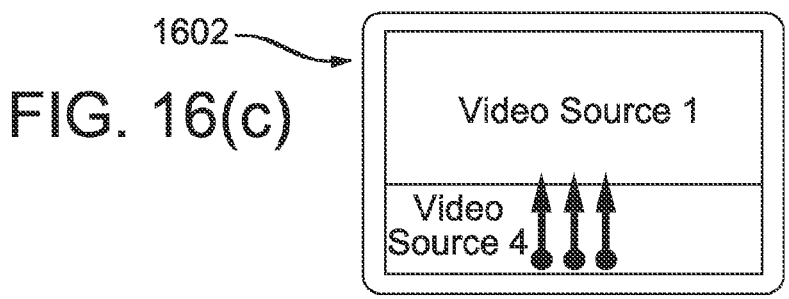
Figure 16D:
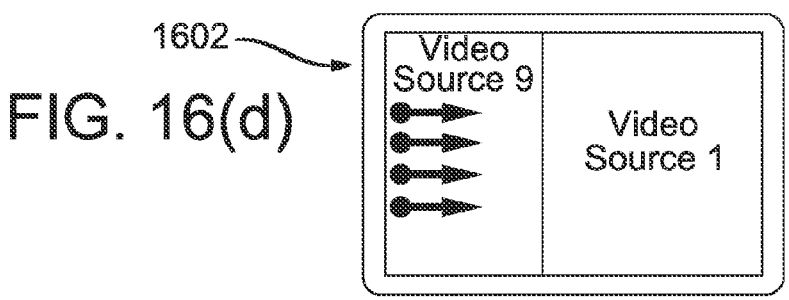

FIG. 15 shows a video display device 1502. The display device has an upper edge or side 1504, a right side or edge 1506, a lower edge or side 1508 and a left side or edge 1510. Each of the dashed circles 1512, 1514, 1516 and 1518 corresponds to a location on the touch activatable display from which a swiping motion can be initiated. The circles are not intended to represent a precise size or shape. The dashed circles can be displayed as a temporary training measure, can be permanently displayed, or can remain not displayed. The arrows are intended to indicate a swiping direction. The arrow associated with dashed circle 1512 is intended to indicate a one-finger swipe. The arrows associated with dashed circle 1514 are intended to indicate a two-finger swipe. The arrows associated with dashed circle 1516 are intended to indicate a three-finger swipe. The arrows associated with dashed circle 1518 are intended to indicate a four-finger swipe.

The practical application of the flowchart 1400 in FIG. 14 is illustrated in FIGS. 16(*a*) through 16(*d*). With reference to flow chart 1400 in FIG. 14, and FIG. 16(*a*), a one-finger width downward swipe will invoke video peeking of Video Source 2 into Video Source 1. With reference to flow chart 1400 in FIG. 14, and FIG. 16(*b*), a two-finger width swipe to the left will invoke video peeking of Video Source 7 into Video Source 1. With reference to flow chart 1400 in FIG. 14, and FIG. 16(*c*), a three-finger width upward swipe will invoke video peeking of Video Source 4 into Video Source 1. With reference to flow chart 1400 in FIG. 14, and FIG. 16(*d*), a four-finger width swipe to the right will invoke video peeking of Video Source 9 into Video Source 1.

It should be noted that the association of a swiping width and swiping direction can be made in a way that can optimize the value of video peeking. For example, FIG. 16(*a*) illustrates video peeking in a downward direction from the top side or edge. It is known that a ticker or banner is typically displayed at the bottom of news and weather related video content. Accordingly, it is advantageous for a user to select sources of news and weather related video content to be invoked by downward directed swipes, so that the ticker or banner is fully visible. Similarly, in sources of video content for sports events, the scores and other status information is often displayed at the top of the video content or in the upper left corner of the video content. A user familiar with the display practices of the broadcasts of the user's favorite teams can also select swiping options that immediately provide information regarding the status of the sports events.

FIGS. 17(*a*) through 17(*e*), are a sequence 1700 of video frames 1702, 1704, 1706, 1708, and 1710 extracted from a video clip to visually illustrate video peeking. In each of the video frames the content of the first video source (Video Source 1 or the primary video or primary video source) is denoted by 1712. Only Video Source 1, in this example, a penguin, is displayed in frame 1702. A circle 1716 and an arrow 1718, as explained in connection with FIGS. 15 and 16(*a*)-16(*d*), are also shown in video frame 1702. In frame 1704, and responsive to a swiping motion in the direction of arrow 1716, part of the primary video 1712 can be seen as being partially displaced and temporarily replaced by a portion of other video content 1714, in this example, a baseball game, which moves in from the right side. In frame 1706, the displacement and replacement of a portion of primary video 1714 is complete. In video frame 1708 the left edge of the other video 1714 can be seen moving to the right and getting smaller. In frame 1710, only primary video 1712 is being displayed once again.

In accordance with presently preferred embodiments video peeking can last for an interval of time, and it is contemplated that the time interval can be adjustable. In further accordance with the presently preferred embodiments, for example, a user can hold or maintain video peeking by continuing to press on the touch screen at the end of the swipe, the video peek thus continuing until the user stops pressing the screen. In further accordance with the presently preferred embodiments, a user peeking at new video who wants to view the peeked at video in full screen can, for example, do so by swiping across the entire screen or by pressing at the end of a swiping motion. In this regard, it is also contemplated that the extent to which a secondary video will displace and replace the primary video can be controlled by the length of the swipe.

In accordance with the inventive arrangements, a user can, for example and without limitation, advantageously view sports, news, or entertainment channels, and can peek at other videos to check scores and breaking news, or even determine if a commercial in an entertainment video has ended, and so return to a primary video source.

The invention claimed is:

1. A method for controlling a video display having a touch activatable screen, comprising the steps of:
    displaying a first video image on said screen;
    detecting a swiping motion across a first area of said screen;
    distinguishing between different possible origins of said swiping motion, different possible directions of said swiping motion and different possible widths of said swiping motion;
    selecting at least one of a plurality of other video images responsive to said distinguishing step;
    supplying said selected video image to said screen for a given interval of time instead of a portion of said first video image; and, terminating said supplying step upon expiration of said interval of time.

2. The method of claim 1, further comprising the step of distinguishing at least one range of length of said swiping motion.

3. The method of claim 2, wherein said step of distinguishing at least one range of length of said swiping motion comprises:
    initiating said supplying step responsive to detecting a first length of said swiping motion occurring within a first range of lengths; and,
    substituting said selected video image for said first video image responsive to detecting a second length of said swiping motion occurring within a second range of lengths exclusive of said first range.

4. The method of claim 2, wherein:

said supplying step further comprises the step of gradually replacing said portion of said first video image by moving said selected video image in a direction that generally corresponds to said direction of said swiping motion; and, said terminating step comprises the step of gradually replacing said selected video image with said portion of said first video image by moving said selected video image in a direction that is generally opposite to said direction of said swiping motion.

5. The method of claim 1, comprising the step of substituting said selected video image for said first video image responsive to detecting a user input other than said swiping motion.

6. The method of claim 1, wherein said supplying step further comprises the step of gradually replacing said portion of said first video image by moving said selected video image in a direction that generally corresponds to said direction of said swiping motion.

7. The method of claim 1, wherein said terminating step comprises the step of gradually replacing said selected video image with said portion of said first video image by moving said selected video image in a direction that is generally opposite to said direction of said swiping motion.

8. The method of claim 1, further comprising the step of associating different ones of said plurality of said other video images with different combinations of said different possible origins, directions and widths of said swiping motion.

9. A user interface for a video display, comprising:

a touch activatable screen;

a touch screen processor capable of detecting swiping motions across areas of said screen, including distinguishing between at least one of different directions of said swiping motions, different lengths of said swiping motions and different widths of said swiping motions;

a video signal processor for selectively supplying a first video image to said screen and for selectively supplying at least one of a plurality of other video images to said screen;

said at least one of said plurality of other video images being selectively supplied to said screen for a given interval of time responsive to a swiping motion across said screen occurring within given ranges of said directions, said lengths and said widths; and, said other video image being supplied to said screen being displayed instead of a portion of said first video image; and, wherein said touch screen processor is capable of detecting swiping motions across areas of said screen, including distinguishing between each of different directions of said swiping motions, different lengths of said swiping motions and different widths of said swiping motions.

10. A user interface for a video display, comprising:

a touch activatable screen;

a touch screen processor capable of detecting swiping motions across areas of said screen, including distinguishing between at least one of different directions of said swiping motions, different lengths of said swiping motions and different widths of said swiping motions;

a video signal processor for selectively supplying a first video image to said screen and for selectively supplying at least one of a plurality of other video images to said screen;

said at least one of said plurality of other video images being selectively supplied to said screen for a given interval of time responsive to a swiping motion across said screen occurring within given ranges of said directions, said lengths and said widths; and, said other video image being supplied to said screen being displayed instead of a portion of said first video image, wherein said touch screen processor is capable of detecting swiping motions across areas of said screen, including distinguishing between at least two of different directions of said swiping motions, different lengths of said swiping motions and different widths of said swiping motions;

wherein each side of said screen is a starting point for at least two of said swiping motions; and, wherein different combinations of said swiping widths and said swiping directions result in different ones of said plurality other video images being selectively supplied to said screen.

11. A user interface for a video display, comprising:

a touch activatable screen;

a touch screen processor capable of detecting swiping motions across areas of said screen, including distinguishing between at least one of different directions of said swiping motions, different lengths of said swiping motions and different widths of said swiping motions;

a video signal processor for selectively supplying a first video image to said screen and for selectively supplying at least one of a plurality of other video images to said screen;

said at least one of said plurality of other video images being selectively supplied to said screen for a given interval of time responsive to a swiping motion across said screen occurring within given ranges of said directions, said lengths and said widths; and, said other video image being supplied to said screen being displayed instead of a portion of said first video image;

wherein said touch screen processor is capable of detecting swiping motions across areas of said screen, including distinguishing between each of different directions of said swiping motions, different lengths of said swiping motions and different widths of said swiping motions;

wherein each side of said screen is a starting point for at least three of said swiping motions; and, wherein different combinations of said swiping widths and said swiping directions result in different ones of said plurality other video images being selectively supplied to said screen.

12. A user interface for a video display, comprising:

a touch activatable screen;

a touch screen processor capable of detecting swiping motions across areas of said screen, including distinguishing between at least one of different directions of said swiping motions, different lengths of said swiping motions and different widths of said swiping motions;

a video signal processor for selectively supplying a first video image to said screen and for selectively supplying at least one of a plurality of other video images to said screen;

said at least one of said plurality of other video images being selectively supplied to said screen for a given interval of time responsive to a swiping motion across said screen occurring within given ranges of said directions, said lengths and said widths; and, said other video image being supplied to said screen being displayed instead of a portion of said first video image;

wherein said touch screen processor is capable of detecting swiping motions across areas of said screen, including distinguishing between each of different directions of said swiping motions, different lengths of said swiping motions and different widths of said swiping motions;

wherein each side of said screen is a starting point for at least three of said swiping motions; and, wherein different combinations of said swiping widths and said swiping directions result in different ones of said plurality other video images being selectively supplied to said screen;

wherein said screen is generally rectangular; and, wherein said different combinations of said swiping widths and said swiping directions can provide said other video images selected from any one of at least eight different video sources.

13. A user interface for a video display, comprising:

a touch activatable screen;

a touch screen processor capable of detecting swiping motions across areas of said screen, including distinguishing between at least one of different directions of said swiping motions, different lengths of said swiping motions and different widths of said swiping motions;

a video signal processer for selectively supplying a first video image to said screen and for selectively supplying at least one of a plurality of other video images to said screen;

said at least one of said plurality of other video images being selectively supplied to said screen for a given interval of time responsive to a swiping motion across said screen occurring within given ranges of said directions, said lengths and said widths; and, said other video image being supplied to said screen being displayed instead of a portion of said first video image;

wherein said touch screen processor is capable of detecting swiping motions across areas of said screen, including distinguishing between each of different directions of said swiping motions, different lengths of said swiping motions and different widths of said swiping motions;

wherein each side of said screen is a starting point for at least three of said swiping motions;

wherein different combinations of said swiping widths and said swiping directions result in different ones of said plurality other video images being selectively supplied to said screen; and, wherein said at least eight different video sources can be assigned to at least eight different combinations of said swiping widths and said swiping directions.

14. A user interface for a video display, comprising:

a touch activatable screen;

a touch screen processor capable of detecting swiping motions across areas of said screen, including distinguishing between at least one of different directions of said swiping motions, different lengths of said swiping motions and different widths of said swiping motions;

a video signal processer for selectively supplying a first video image to said screen and for selectively supplying at least one of a plurality of other video images to said screen;

said at least one of said plurality of other video images being selectively supplied to said screen for a given interval of time responsive to a swiping motion across said screen occurring within given ranges of said directions, said lengths and said widths; and, said other video image being supplied to said screen being displayed instead of a portion of said first video image, wherein said touch screen processor is capable of detecting swiping motions across areas of said screen, including distinguishing between each of different directions of said swiping motions, different lengths of said swiping motions and different widths of said swiping motions; and, wherein a swiping motion longer in length than is necessary to initiate displaying one of said other video images on said screen results in said one of said other video images being substituted for said first video image.

* * * * *